(12) United States Patent
Adare et al.

(10) Patent No.: US 11,096,026 B2
(45) Date of Patent: Aug. 17, 2021

(54) ROAD NETWORK CHANGE DETECTION AND LOCAL PROPAGATION OF DETECTED CHANGE

(71) Applicant: HERE Global B.V., Eindhoven (NL)

(72) Inventors: Andrew Adare, Eindhoven (NL); Nicholas Dronen, Eindhoven (NL)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/352,206

(22) Filed: Mar. 13, 2019

(65) Prior Publication Data

US 2020/0296558 A1    Sep. 17, 2020

(51) Int. Cl.
*G08G 1/123* (2006.01)
*H04W 4/46* (2018.01)
(Continued)

(52) U.S. Cl.
CPC ............ *H04W 4/46* (2018.02); *H04W 4/38* (2018.02); *H04W 4/80* (2018.02); *H04W 68/005* (2013.01);
(Continued)

(58) Field of Classification Search
CPC .......... H04W 4/46; H04W 4/38; H04W 4/80; H04W 68/005; G01C 21/3691; G05D 1/0276; G08G 1/096791
(Continued)

(56) References Cited

U.S. PATENT DOCUMENTS 5,517,419 A    5/1996 Lanckton et al.
6,526,284 B1    2/2003 Sharp et al.
(Continued)

FOREIGN PATENT DOCUMENTS

DE    102010055370 A1    6/2012
DE    102014217847 A1    3/2016
(Continued)

OTHER PUBLICATIONS

*3D Mobile Mapping*, pp. 1-5, [online], [retrieved from the Internet Jul. 18, 2019] <URL:https://web.archive.org/web/20160314203351/heep://www.egis.co.za/services/3D_mobile_mapping>.
(Continued)

*Primary Examiner* — Kerri L McNally
*Assistant Examiner* — Thang D Tran
(74) *Attorney, Agent, or Firm* — Alston & Bird LLP

(57) ABSTRACT

Changes in a road network may be detected and information/data regarding the change may be locally propagated in at least near real time with respect to the detection of the change. A vehicle apparatus onboard a vehicle analyzes sensor data collected as the vehicle traverses at least a portion of a road network. The sensor data is captured by sensors onboard the vehicle. The sensor data is analyzed in at least near real time with respect to the capturing of the sensor data. The vehicle apparatus detects an inconsistency between a result of the analysis of the sensor data and map data stored in the memory. Responsive to the detected inconsistency satisfying a vehicle-to-vehicle criterion, the vehicle apparatus generates a notification message comprising an indication of the detected inconsistency. The vehicles apparatus transmits the notification message via a communication interface using a short or medium range communication protocol.

20 Claims, 9 Drawing Sheets

(51) Int. Cl.
| | |
|---|---|
| *H04W 4/38* | (2018.01) |
| *H04W 4/80* | (2018.01) |
| *H04W 68/00* | (2009.01) |
| *G01C 21/36* | (2006.01) |
| *G05D 1/02* | (2020.01) |
| *G08G 1/0967* | (2006.01) |

(52) U.S. Cl.
CPC ....... *G01C 21/3691* (2013.01); *G05D 1/0276* (2013.01); *G08G 1/096791* (2013.01)

(58) Field of Classification Search
USPC .................................................. 340/995.27
See application file for complete search history.

(56) References Cited

U.S. PATENT DOCUMENTS

| | | | |
|---|---|---|---|
| 6,675,081 | B2 | 1/2004 | Shuman et al. |
| 7,552,008 | B2 | 6/2009 | Newstrom et al. |
| 8,699,755 | B2 | 4/2014 | Stroila et al. |
| 8,750,567 | B2 | 6/2014 | Zhang et al. |
| 8,751,150 | B2 | 6/2014 | Stahlin |
| 9,123,152 | B1 | 9/2015 | Chatham |
| 9,140,555 | B1* | 9/2015 | Andersson ........... G01C 21/165 |
| 9,140,792 | B2 | 9/2015 | Zeng |
| 9,372,089 | B2 | 6/2016 | Bennah et al. |
| 9,459,626 | B2 | 10/2016 | Chen et al. |
| 9,478,138 | B2 | 10/2016 | Nagy |
| 9,489,601 | B2 | 11/2016 | Fairfield et al. |
| 9,530,062 | B2 | 12/2016 | Nguyen et al. |
| 9,553,998 | B2* | 1/2017 | Permude ............. H04M 15/863 |
| 9,710,714 | B2 | 7/2017 | Chen et al. |
| 9,721,471 | B2 | 8/2017 | Chen et al. |
| 9,834,207 | B2 | 12/2017 | O'Dea et al. |
| 2003/0043260 | A1* | 3/2003 | Yap ......................... H04N 7/147 348/14.06 |
| 2003/0156049 | A1* | 8/2003 | Behr ................ G08G 1/096816 340/995.2 |
| 2004/0247157 | A1 | 12/2004 | Lages et al. |
| 2010/0070160 | A1 | 3/2010 | Haatainen et al. |
| 2011/0015854 | A1* | 1/2011 | Mudalige ........... G01C 21/3667 701/533 |
| 2011/0275388 | A1* | 11/2011 | Haney ................ H04M 1/72519 455/456.3 |
| 2011/0302214 | A1* | 12/2011 | Frye .................. G06F 16/24575 707/802 |
| 2013/0006925 | A1 | 1/2013 | Sawai et al. |
| 2013/0253732 | A1* | 9/2013 | Patel ....................... G08G 1/20 701/2 |
| 2014/0104051 | A1 | 4/2014 | Breed |
| 2014/0132723 | A1 | 5/2014 | More |
| 2014/0229279 | A1 | 8/2014 | Hohs |
| 2014/0350839 | A1 | 11/2014 | Pack et al. |
| 2015/0123778 | A1* | 5/2015 | Konet ..................... G08B 21/02 340/435 |
| 2015/0254977 | A1* | 9/2015 | Grabow ............... G08G 1/0141 340/903 |
| 2015/0256534 | A1* | 9/2015 | Goudy ................ H04L 63/0823 713/156 |
| 2015/0266471 | A1 | 9/2015 | Ferguson et al. |
| 2015/0371094 | A1 | 12/2015 | Gardiner et al. |
| 2016/0026899 | A1 | 1/2016 | Wang et al. |
| 2016/0094420 | A1* | 3/2016 | Clemm ................... H04L 43/04 709/224 |
| 2016/0171893 | A1 | 6/2016 | Chen et al. |
| 2016/0176341 | A1 | 6/2016 | Raghu et al. |
| 2016/0197799 | A1* | 7/2016 | Clemm ................... H04L 43/06 709/202 |
| 2016/0221592 | A1* | 8/2016 | Puttagunta ............... B61L 25/04 |
| 2016/0258777 | A1* | 9/2016 | Bodake ................ G01C 21/367 |
| 2016/0282127 | A1* | 9/2016 | Goto ..................... G01S 5/0027 |
| 2016/0368492 | A1* | 12/2016 | Al-Stouhi ............ G08G 1/162 |
| 2017/0003396 | A1 | 1/2017 | Adachi |
| 2017/0008455 | A1* | 1/2017 | Goudy ................... B60Q 9/008 |
| 2017/0008521 | A1* | 1/2017 | Braunstein ............ G01C 21/36 |
| 2017/0032671 | A1* | 2/2017 | Toyama ................. H04L 63/123 |
| 2017/0122749 | A1* | 5/2017 | Urano ..................... G01S 19/42 |
| 2017/0166219 | A1* | 6/2017 | Jammoussi ......... B60W 50/045 |
| 2017/0217368 | A1* | 8/2017 | Lewis ....................... B60R 1/00 |
| 2017/0236419 | A1* | 8/2017 | Grewe ................... G08G 1/161 340/870.07 |
| 2017/0243485 | A1* | 8/2017 | Rubin ..................... G08G 1/052 |
| 2017/0307398 | A1* | 10/2017 | Iwaasa ................. G05D 1/0274 |
| 2017/0337813 | A1* | 11/2017 | Taylor ................... G05D 1/0287 |
| 2017/0345228 | A1* | 11/2017 | Dibb ....................... G07C 5/008 |
| 2018/0005254 | A1* | 1/2018 | Bai ..................... G06Q 30/0203 |
| 2018/0101173 | A1* | 4/2018 | Banerjee ............. H04N 5/23248 |
| 2018/0151066 | A1* | 5/2018 | Oba ..................... G01C 21/3407 |
| 2018/0164825 | A1* | 6/2018 | Matus ................ B60W 50/0098 |
| 2018/0188037 | A1 | 7/2018 | Wheeler et al. |
| 2018/0188039 | A1 | 7/2018 | Chen et al. |
| 2018/0188372 | A1 | 7/2018 | Wheeler et al. |
| 2018/0189578 | A1* | 7/2018 | Yang ..................... G06K 9/4638 |
| 2018/0189678 | A1 | 7/2018 | Gupta et al. |
| 2018/0197412 | A1* | 7/2018 | Uchiyama ............... H04W 4/90 |
| 2018/0231387 | A1 | 8/2018 | Thiel et al. |
| 2018/0288589 | A1* | 10/2018 | Punithan ................. H04W 4/46 |
| 2018/0300564 | A1* | 10/2018 | Kwant ..................... G06K 9/48 |
| 2018/0304904 | A1 | 10/2018 | Stahlin |
| 2018/0364717 | A1* | 12/2018 | Douillard ............. G05D 1/0212 |
| 2018/0364734 | A1* | 12/2018 | Ferguson ............. G05D 1/0274 |
| 2019/0019409 | A1 | 1/2019 | Farr et al. |
| 2019/0025838 | A1 | 1/2019 | Artes et al. |
| 2019/0035277 | A1* | 1/2019 | Son ....................... G08G 1/0965 |
| 2019/0080142 | A1* | 3/2019 | Abeywardena ...... G06K 9/0063 |
| 2019/0128678 | A1 | 5/2019 | Merfels et al. |
| 2019/0132709 | A1* | 5/2019 | Graefe ..................... H04W 4/38 |
| 2019/0137287 | A1* | 5/2019 | Pazhayampallil ...... H04W 4/40 |
| 2019/0139403 | A1* | 5/2019 | Alam ...................... H04W 4/40 |
| 2019/0141495 | A1* | 5/2019 | Jha ........................ H04W 84/18 |
| 2019/0205695 | A1 | 7/2019 | Yan et al. |
| 2019/0271550 | A1* | 9/2019 | Breed ................... G08G 1/147 |
| 2019/0278273 | A1 | 9/2019 | Behrendt et al. |
| 2019/0279247 | A1* | 9/2019 | Finken ................. G06F 21/602 |
| 2019/0286151 | A1* | 9/2019 | Palanisamy ........ G01C 21/3461 |
| 2019/0291742 | A1* | 9/2019 | Leach ................. B60W 50/0205 |
| 2019/0295003 | A1* | 9/2019 | Dronen ................. G05D 1/0088 |
| 2019/0370566 | A1 | 12/2019 | Su et al. |
| 2020/0027241 | A1 | 1/2020 | Tong et al. |
| 2020/0098135 | A1 | 3/2020 | Ganjineh et al. |
| 2020/0104608 | A1 | 4/2020 | Watanabe et al. |
| 2020/0141729 | A1 | 5/2020 | Nishita |
| 2020/0184233 | A1 | 6/2020 | Berberian et al. |
| 2020/0209852 | A1* | 7/2020 | Soryal ................. H04L 63/1416 |
| 2020/0210769 | A1 | 7/2020 | Hou et al. |
| 2020/0249032 | A1* | 8/2020 | Lee ..................... G01C 21/3848 |
| 2020/0250439 | A1 | 8/2020 | Vig et al. |
| 2020/0302189 | A1 | 9/2020 | Shu |

FOREIGN PATENT DOCUMENTS

| | | |
|---|---|---|
| DE | 102016211751 A1 | 1/2018 |
| EP | 3 165 879 A1 | 5/2017 |
| WO | WO-2017/025334 A1 | 2/2017 |
| WO | WO-2017/076410 A1 | 5/2017 |
| WO | WO-2017/200532 A1 | 11/2017 |
| WO | WO-2017/215829 A1 | 12/2017 |
| WO | WO-2018/017793 A1 | 1/2018 |
| WO | WO-2018/104563 A2 | 6/2018 |

OTHER PUBLICATIONS

Varela-Gonzalez, et al., *A Citygml Extension for Traffic-Sign Objects That Guides the Automatic Processing of Data Collected Using Mobile Mapping Technology*, The International Archives of the Photogrammetry, Remote Sensing and Spatial Information Sciences, vol. XL-1, ISPRS Technical Commission I Symposium, Nov. 17-20, 2014, pp. 415-420, Denver, Colorado.

(56) References Cited

OTHER PUBLICATIONS

Lipski et al., A Fast and Robust Approach to Lane Marking Detection and Lane Tracking, *2008 IEEE Southwest Symposium on Image Analysis and Interpretation*, May 12, 2008, pp. 57-60, Santa Fe, New Mexico, [retrieved from the Internet Jul. 18, 2019] <URL: https://ieeexplore.ieee.org/abstract/document/4512284>.
Kim et al., *Detection and Tracking of Road Barrier Based on Radar and Vision Sensor Fusion*, Journal of Sensors, vol. 2016, Article ID 1963450, (2016), pp. 1-8, [retrieved from the Internet Jul. 18, 2019] <URL: https://doi.org/10.1155/2016/1963450>.
Sairam et al., *Development of Mobile Mapping System for 3D Road Asset Inventory*, Sensors, vol. 16(3):367, Mar. 12, 2016, pp. 1-19, Basel, Switzerland. DOI:10.3390/s16030367.
Olson et al., *Exploration and Mapping With Autonomous Robot Teams Results From the MAGIC 2010 Competition*, Magazine Communications of he ACM, vol. 56, Issue 3, Mar. 2013, pp. 1-7. DOI: 10.1145/2428556.2428574.
Lemmens, *Mobile Laser Scanning Point Clouds—Automatic 3D Mapping of Road Objects*, Geomatrics World Newsletter, Jan. 15, 2018, (3 pages), [retrieved from the Internet Jul. 18, 2019] <URL: https://www.geomatics-world.co.uk/content/article/mobile-laser-scanning-point-clouds-automatic-3d-manping-of-road-objects>.
Jo et al., *Precise Localization of an Autonomous Car Based on Probabilistic Noise Models of Road Surface marker Features Using Multiple Cameras*, IEEE Transactions on Intelligent Transportation Systems, vol. 16, Issue 6, Dec. 2015, pp. 3377-3392. DOI: 10.1109/TITS.2015.2450738.
Condliffe, *Your Car's Sensors Are About to Shorten Your Commute*, MIT Technology Review, Sep. 26, 2016, (21pages), [online], [retrieved from the Internet Jul. 18, 2019] <URL: https://www.technologyreview.com/s/602463/your-cars-sensors-are-about-to-shorten-your-commute/>.
Reichardt, Dirk et al. *CarTALK 2000: Safe and Comfortable Driving Based Upon Inter-Vehicle-Communication*, Intelligent Vehicle Symposium, vol. 2, Jun. 17 2002, pp. 545-550. DOI: 10.1109/ivs.2002.1188007.
Özünger Ümit et al. *Systems for Safety and Autonomous Behavior in Cars: The DRAPA Grand Challenge Experience*, Proceedings of the IEEE, vol. 95, No. 2, Feb. 2007, pp. 397-412.
Laugier, Christian et al. *Probabilistic Analysis of Dynamic Scenes and Collision Risks Assessment to Improve Driving Safety*, Its Journal, Informa UK(Taylor & Francis), (2011), vol. 3, No. 4, pp. 4-19. DOI: 10.1109/MITS.2011.942779.
European Patent Office, Extended European Search Report received for EP Application No. 20161911.1, dated Aug. 11, 2020, 9 pages, Germany.
European Patent Office, Extended European Search Report received for EP Application No. 20162991.2, dated Aug. 13, 2020, 10 pages.
United States Patent and Trademark Office, Non-Final Office Action for U.S. Appl. No. 16/352,337 dated Oct. 14, 2020, 30 pages.
United States Patent and Trademark Office, Non-Final Office Action for U.S. Appl. No. 16/352,265 dated Oct. 20, 2020, 34 pages.
United States Patent and Trademark Office, Non-Final Office Action for U.S. Appl. No. 16/352,286 dated Oct. 13, 2020, 32 pages.
United States Patent and Trademark Office, Non-Final Office Action for U.S. Appl. No. 16/352,327 dated Oct. 27, 2020, 37 pages.
United States Patent and Trademark Office, Non-Final Office Action for U.S. Appl. No. 16/352,317 dated Nov. 2, 2020, 37 pages.
United States Patent and Trademark Office, Non-Final Office Action for U.S. Appl. No. 16/352,301 dated Nov. 3, 2020, 29 pages.
United States Patent and Trademark Office, Non-Final Office Action for U.S. Appl. No. 16/352,278 dated Nov. 3, 2020, 42 pages.
United States Patent and Trademark Office, Non-Final Office Action for U.S. Appl. No. 16/352,254 dated Nov. 4, 2020, 38 pages.
United States Patent and Trademark Office, Non-Final Office Action for U.S. Appl. No. 16/352,225 dated Nov. 5, 2020, 20 pages.
Cabo et al., "An Algorithm for Automatic Detection of Pole-Like Street Furniture Objects from Mobile Laser Scanner Point Clouds", ISPRS Journal of Photogrammetry and Remote Sensing 87 (2014), pp. 47-56.
United States Patent and Trademark Office, Final Office Action for U.S. Appl. No. 16/352,286 dated Mar. 3, 2021.
United States Patent and Trademark Office, Final Office Action for U.S. Appl. No. 16/352,265 dated Mar. 8, 2021.
United States Patent and Trademark Office, Final Office Action for U.S. Appl. No. 16/352,301 dated Mar. 8, 2021.
United States Patent and Trademark Office, Final Office Action for U.S. Appl. No. 16/352,337 dated Mar. 8, 2021.
United States Patent and Trademark Office, Final Office Action for U.S. Appl. No. 16/352,225 dated Apr. 6, 2021.
United States Patent and Trademark Office, Final Office Action for U.S. Appl. No. 16/352,254 dated Apr. 7, 2021.
United States Patent and Trademark Office, Final Office Action for U.S. Appl. No. 16/352,278 dated Apr. 7, 2021.
United States Patent and Trademark Office, Final Office Action for U.S. Appl. No. 16/352,317 dated Apr. 7, 2021.
United States Patent and Trademark Office, Final Office Action for U.S. Appl. No. 16/352,327 dated Apr. 8, 2021.

\* cited by examiner

{
    Location = 34.762538, -83.424454, 1006.5342
    Classification = stop_sign
    ID = ST4325
    Covariance_Matrix = [A, B, C, D, E, F, G, H, I]
    Orientation = 223°
    Height = 8.3234 feet
    Width = 2.128 feet
    Shape = octagonal
    Color = red
}

FIG. 3

ROAD NETWORK CHANGE DETECTION AND LOCAL PROPAGATION OF DETECTED CHANGE

TECHNOLOGICAL FIELD

An example embodiment relates generally to detecting and/or communicating changes in a road network. An example embodiment relates generally to locally propagating detected changes in a road network.

BACKGROUND

In various scenarios, a change may occur in a portion of a road network that may affect the ability of a vehicle (autonomous vehicle, vehicle with advanced driving assistance system (ADAS), and/or human operated vehicle) to traverse the portion of the road network. For example, changes to a road network such as weather related changes (e.g., local flooding of a road way, a mud, land, and/or rock slide blocking at least a portion of a road way, and/or the like), traffic related changes (e.g., an accident blocking one or more lanes of traffic, and/or the like), infrastructure related changes (e.g., emergency road work, a broken water main, and/or the like blocking one or more lanes of traffic), and/or other road network changes may not be accurately reflected in a digital map stored onboard a vehicle apparatus when a corresponding vehicle traverses the road network. Thus, changes in the road network may significantly affect the ability of a vehicle to traverse the corresponding portion of the road network.

BRIEF SUMMARY OF SOME EXAMPLE EMBODIMENTS

Various embodiments provide methods, systems, apparatuses, and computer program products for propagating local changes detected in a road network. For example, a vehicle apparatus may be onboard a vehicle traversing at least a portion of a road network. The vehicle apparatus may store one or more tiles of a digital map corresponding to at least a portion of the road network in local memory of the vehicle apparatus. As the vehicle traverses at least a portion of the road network, one or more sensors of the vehicle apparatus and/or onboard the vehicle may capture sensor information/data. The vehicle apparatus may analyze the sensor information/data in real time and/or near real time with respect to the capturing of the sensor information/data. In various embodiments, the vehicle apparatus may be configured to identify inconsistencies between the map information/data of the one or more tiles of the digital map. When an inconsistency between the results of the analysis of the sensor information/data and map information/data of the one or more tiles of the digital map is identified, it is determined if the detected inconsistency satisfies one or more vehicle-to-vehicle (V2V) criteria. For example, if the detected inconsistency indicates that one or more lanes of a road segment are unpassable, it may be determined that the detected inconsistency satisfies one or more V2V criteria. In another example, if the detected inconsistency is a minor change in the location of a traffic sign (e.g., the location of the traffic sign in the sensor information/data is, for example, three inches from the location of the traffic sign in the map information/data), then the detected inconsistency may not satisfy the V2V criteria.

In various embodiments, if the detected inconsistency satisfies one or more V2V criteria, the vehicle apparatus may generate a notification message that comprises an indication of the detected inconsistency. For example, the notification message may be a basic safety message. For example, the notification message may comprise a maplet. A maplet is a data structure comprising (a) abstracted, parameterized, fused representations of environment elements detected in sensor information/data captured by one or more sensors of a vehicle apparatus and (b) a representation of the vehicle's trajectory history for a segment of a vehicle's trajectory. In an example embodiment, the segment of the vehicle's trajectory may correspond to a single vehicle ignition cycle. In various embodiments, the data structure of the maplet is a predefined, standardized data structure. In various embodiments, the generated notification message may be broadcast via one or more short or medium range communication protocol. In an example embodiment, the notification message may be broadcast via a designated short range communication (DSRC) protocol. DSRC protocol is a one-way or two-way short-to-medium range wireless communication protocol configured for use by intelligent transportation systems for permitting communication directly between vehicles. In Report and Order FCC-03-324, the Federal Communications Commission (FCC) allocated 75 MHz of spectrum in the 5.9 GHz band for use by Intelligent Transportations Systems (ITS) vehicle safety and mobility applications. In various embodiments, the notification message and/or the indication of the detected inconsistency may be transmitted in a compressed format. For example, a maplet may be compressed for transmission as a payload of a basic safety message.

In various embodiments, a receiving vehicle apparatus may receive the notification message. The notification message and/or a portion/payload thereof may be decompressed, used to update one or more tiles of a digital map stored locally by the receiving vehicle apparatus, trigger an alert to passengers of the vehicle, adjust one or more driving parameters of an autonomous vehicle and/or an ADAS-enabled vehicle, and/or the like. In an example embodiment, the receiving vehicle apparatus may transmit the notification message. For example, the receiving vehicle apparatus may receive the notification message, process the notification message, perform one or more actions based on the indication of the detected inconsistency, transmit the notification message, and/or the like.

In various embodiments, an infrastructure apparatus may receive the notification message. For example, an infrastructure apparatus may be secured to and/or a part of an infrastructure element of the road network. For example, an infrastructure apparatus may be secured to and/or a part of a traffic light, a road sign, a street light, a pedestrian traffic signal, and/or the like. The infrastructure apparatus may store the indication of the detected inconsistency in memory local to the infrastructure apparatus and may transmit the notification message. In an example embodiment, the infrastructure apparatus may determine there is an existing indication of a detected inconsistency stored in the memory local to the infrastructure apparatus that corresponds to the same inconsistency between detected current conditions (e.g., as indicated by the results of the vehicle apparatus's analysis of the sensor information/data) and the map information/data of at least a portion of a digital map (e.g., one or more tiles of the digital map) that are stored by and/or available to the vehicle apparatus as the detected inconsistency indicated in the notification message. If it is determined that an existing indication of a detected inconsistency that does correspond to the same inconsistency as the received notification message, the infrastructure apparatus may fuse the two indications of the inconsistency or select one of the indications of the inconsistency to store and/or transmit.

In various embodiments, one or more computer networks may not be available in one or more portions of the road network. For example, in a portion of the road network, a vehicle apparatus and/or infrastructure apparatus may not be able to access the Internet, automotive cloud, and/or computer network. For example, in some rural areas and/or the like, communications may be limited and access to the Internet or the automotive cloud may be available to a vehicle apparatus and/or infrastructure apparatus. A collection apparatus may traverse a path in the vicinity of one or more infrastructure apparatuses in one or more communication-limited portions of the road network and receive one or more notification messages from one or more infrastructure apparatuses and/or vehicle apparatuses. The collection apparatus may then provide the notification messages to a network apparatus for updating of the map information/data of the digital map once the collection apparatus is in a location where the collection apparatus can access the Internet, automotive cloud, and/or another computer network. In an example embodiment, a collection apparatus is onboard an autonomous or remotely controlled collection vehicle. In an example embodiment, the remotely controlled collection vehicle is a drone and/or an unmanned aircraft. In an example embodiment, a vehicle apparatus 20 may double as a collection apparatus 40.

The network apparatus may be configured to receive notification messages and/or update messages via the Internet, automotive cloud, and/or the like update the digital map and/or portions thereof based on the information/data provided by the notification messages and/or update messages, and provide the updated digital map and/or one or more tiles of the updated digital map to one or more vehicle apparatuses. In an example embodiment, the digital map may be a high definition map that may be used for navigation functions for an autonomous, self-driving vehicle, an advanced driver assistances system (ADAS), and/or a human operator. For example, the digital map and/or portions thereof may be used to perform navigation functions such as localization, route determination, lane level route determination, lane maintenance, route guidance, lane level route guidance, provision of traffic information/data, provision of lane level traffic information/data and/or the like.

In an example embodiment, sensor information/data is analyzed by a vehicle apparatus comprising a processor and a memory and disposed onboard a vehicle. The sensor data is collected as the vehicle traverses at least a portion of the road network. The sensor data is captured by one or more sensors onboard the vehicle. The sensor data is analyzed in at least near real time with respect to the capturing of the sensor data by the one or more sensors. The vehicle apparatus detects an inconsistency between a result of analyzing the sensor data and map data stored in the memory based on the analyzing of the sensor data. Responsive to the detected inconsistency satisfying a vehicle-to-vehicle criterion, the vehicle apparatus generates a notification message comprising an indication of the detected inconsistency. The vehicle apparatus transmits the notification message via a communication interface of the vehicle apparatus and using a short or medium range communication protocol.

In accordance with an example embodiment, a method is provided. In an example embodiment, the method comprises analyzing, by a vehicle apparatus comprising a processor and a memory, sensor data collected as the vehicle apparatus traverses at least a portion of a road network. The sensor data is captured by one or more sensors onboard a vehicle. The vehicle apparatus is onboard the same vehicle. The sensor data is analyzed in at least near real time with respect to the capturing of the sensor data by the one or more sensors. The method further comprises detecting, based on the analyzing of the sensor data by the vehicle apparatus, an inconsistency between the sensor data and map data stored in the memory. The method further comprises, responsive to the detected inconsistency satisfying a vehicle-to-vehicle criterion, generating, by the vehicle apparatus, a notification message comprising an indication of the detected inconsistency; and transmitting, via a communication interface of the vehicle apparatus and via a short or medium range communication protocol, the notification message.

In an example embodiment, the notification message is a basic safety message (BSM). In an example embodiment, the short or medium range communication protocol is a dedicated short range communication (DSRC) protocol configured for use with an intelligent transportation system. In an example embodiment, the notification message comprises a compressed maplet. For example, in an example embodiment, the indication of the detected inconsistency is a maplet. In an example embodiment, an intended recipient of the notification message comprises at least one of a receiving vehicle apparatus or an infrastructure apparatus. In an example embodiment, when an infrastructure apparatus receives the notification message, the infrastructure apparatus stores the notification message to memory local to the infrastructure apparatus and transmits the notification message, the intended recipient of the notification message comprising at least one of a receiving vehicle apparatus or a collection apparatus. In an example embodiment, responsive to receiving and processing the notification message, a receiving vehicle apparatus performs at least one of (a) updating map information stored by a memory of the receiving vehicle apparatus based on the detected inconsistency, (b) providing an alert to passengers within the vehicle that the receiving vehicle apparatus is onboard based on the detected inconsistency, (c) adjusting one or more driving parameters of the vehicle that the receiving vehicle apparatus is onboard, or (d) transmitting the notification message. In an example embodiment, the vehicle apparatus is in communication with a network that provides access to an automotive cloud, transmitting an update message comprising an indication of the detected inconsistency via the network, wherein a network apparatus receives the update message and updates a digital map based on the indication of the detected inconsistency. In an example embodiment, the vehicle-to-vehicle criterion is configured to identify detected inconsistencies that are likely to affect the performance or result of a navigation function.

In accordance with an example embodiment, an apparatus is provided. In an example embodiment, the apparatus comprises at least one processor, a communications interface configured for communicating via at least one network, one or more sensors, and at least one memory storing computer program code and map data. The apparatus is onboard a vehicle. The at least one memory and the computer program code is configured to, with the processor, cause the apparatus to at least analyze sensor data collected as the vehicle traverses at least a portion of a road network. The sensor data is captured by the one or more sensors and is analyzed in at least near real time with respect to the capturing of the sensor data by the one or more sensors. The at least one memory and the computer program code is further configured to, with the processor, cause the apparatus to at least detect, based on the analyzing of the sensor data, an inconsistency between the sensor data and the map data stored in the memory; responsive to the detected inconsistency satisfying a vehicle-to-vehicle criterion, generate a notification message comprising an indication of the detected inconsistency; and transmit, via the communication interface and via a short or medium range communication protocol, the notification message.

In an example embodiment, the notification message is a basic safety message (BSM). In an example embodiment, the short or medium range communication protocol is a dedicated short range communication (DSRC) protocol configured for use with an intelligent transportation system. In an example embodiment, the notification message comprises a compressed maplet. For example, in an example embodiment, the indication of the detected inconsistency is a maplet. In an example embodiment, an intended recipient of the notification message comprises at least one of a receiving vehicle apparatus or an infrastructure apparatus. In an example embodiment, when an infrastructure apparatus receives the notification message, the infrastructure apparatus stores the notification message to memory local to the infrastructure apparatus and transmits the notification message, the intended recipient of the notification message comprising at least one of a receiving vehicle apparatus or a collection apparatus. In an example embodiment, responsive to receiving and processing the notification message, a receiving vehicle apparatus performs at least one of (a) updating map information stored by a memory of the receiving vehicle apparatus based on the detected inconsistency, (b) providing an alert to passengers within the vehicle that the receiving vehicle apparatus is onboard based on the detected inconsistency, (c) adjusting one or more driving parameters of the vehicle that the receiving vehicle apparatus is onboard, or (d) transmitting the notification message. In an example embodiment, the vehicle apparatus is in communication with a network that provides access to an automotive cloud, transmitting an update message comprising an indication of the detected inconsistency via the network, wherein a network apparatus receives the update message and updates a digital map based on the indication of the detected inconsistency. In an example embodiment, the vehicle-to-vehicle criterion is configured to identify detected inconsistencies that are likely to affect the performance or result of a navigation function.

In accordance with an example embodiment, a computer program product is provided that comprises at least one non-transitory computer-readable storage medium having computer-executable program code instructions stored therein. The computer-executable program code instructions comprise program code instructions that are configured, when executed by a processor of a vehicle apparatus, to cause the vehicle apparatus to analyze sensor data collected as a corresponding vehicle traverses at least a portion of a road network. The sensor data is captured by one or more sensors onboard the corresponding vehicle and is analyzed in at least near real time with respect to the capturing of the sensor data by the one or more sensors. The computer-executable program code instructions comprise program code instructions that are further configured, when executed by a processor of a vehicle apparatus, to cause the vehicle apparatus to detect, based on the analyzing of the sensor data, an inconsistency between the sensor data and the map data stored in memory of the vehicle apparatus; responsive to the detected inconsistency satisfying a vehicle-to-vehicle criterion, generate a notification message comprising an indication of the detected inconsistency; and transmit, via a communication interface of the vehicle apparatus and via a short or medium range communication protocol, the notification message.

In an example embodiment, the notification message is a basic safety message (BSM). In an example embodiment, the short or medium range communication protocol is a dedicated short range communication (DSRC) protocol configured for use with an intelligent transportation system. In an example embodiment, the notification message comprises a compressed maplet. For example, in an example embodiment, the indication of the detected inconsistency is a maplet. In an example embodiment, an intended recipient of the notification message comprises at least one of a receiving vehicle apparatus or an infrastructure apparatus. In an example embodiment, when an infrastructure apparatus receives the notification message, the infrastructure apparatus stores the notification message to memory local to the infrastructure apparatus and transmits the notification message, the intended recipient of the notification message comprising at least one of a receiving vehicle apparatus or a collection apparatus. In an example embodiment, responsive to receiving and processing the notification message, a receiving vehicle apparatus performs at least one of (a) updating map information stored by a memory of the receiving vehicle apparatus based on the detected inconsistency, (b) providing an alert to passengers within the vehicle that the receiving vehicle apparatus is onboard based on the detected inconsistency, (c) adjusting one or more driving parameters of the vehicle that the receiving vehicle apparatus is onboard, or (d) transmitting the notification message. In an example embodiment, the vehicle apparatus is in communication with a network that provides access to an automotive cloud, transmitting an update message comprising an indication of the detected inconsistency via the network, wherein a network apparatus receives the update message and updates a digital map based on the indication of the detected inconsistency. In an example embodiment, the vehicle-to-vehicle criterion is configured to identify detected inconsistencies that are likely to affect the performance or result of a navigation function.

In accordance with yet another example embodiment of the present invention, a vehicle apparatus is provided that comprises means for analyzing sensor data collected as a vehicle apparatus traverses at least a portion of a road network. The sensor data is captured by one or more sensors onboard a vehicle. The vehicle apparatus is onboard the same vehicle. The sensor data is analyzed in at least near real time with respect to the capturing of the sensor data by the one or more sensors. The vehicle apparatus further comprises means for detecting, based on the analyzing of the sensor data, an inconsistency between the sensor data and map data stored in the memory of the vehicle apparatus. The vehicle apparatus further comprises means for, responsive to the detected inconsistency satisfying a vehicle-to-vehicle criterion, generating a notification message comprising an indication of the detected inconsistency. The vehicle apparatus further comprises means for transmitting, via a short or medium range communication protocol, the notification message.

BRIEF DESCRIPTION OF THE DRAWINGS

Figure 1:
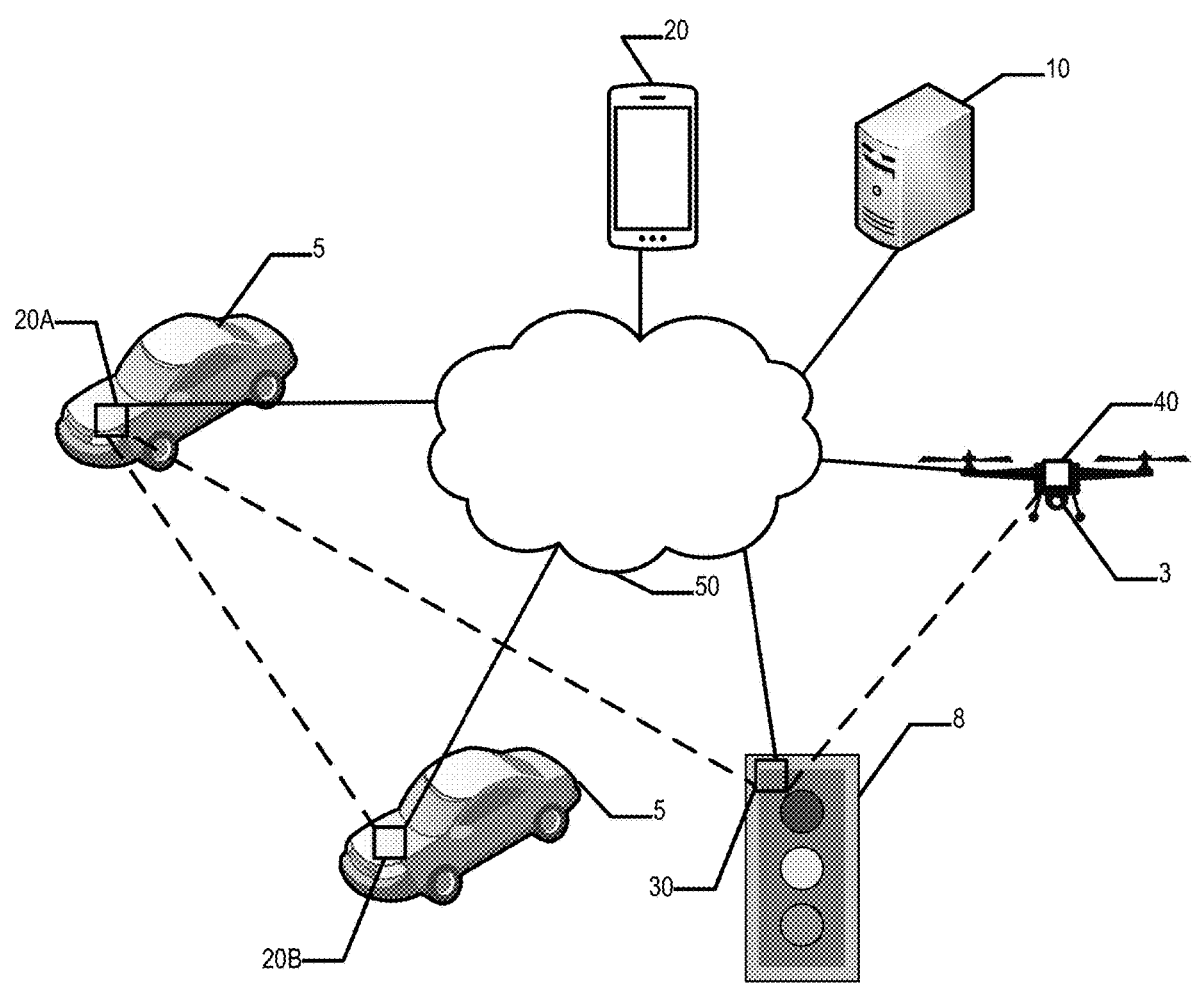
Figure 2A:
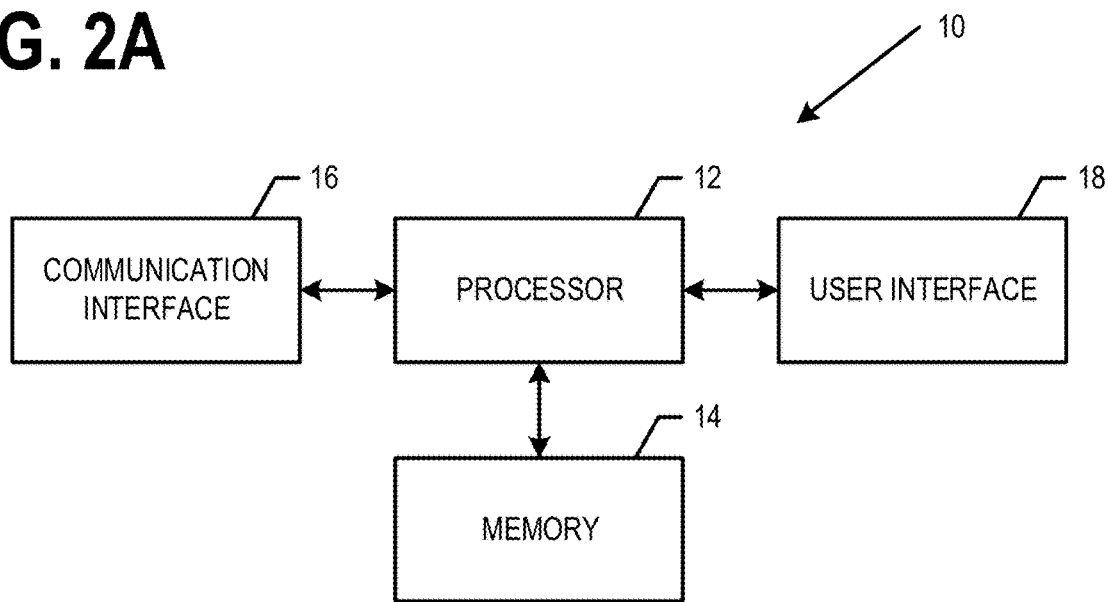
Figure 2B:
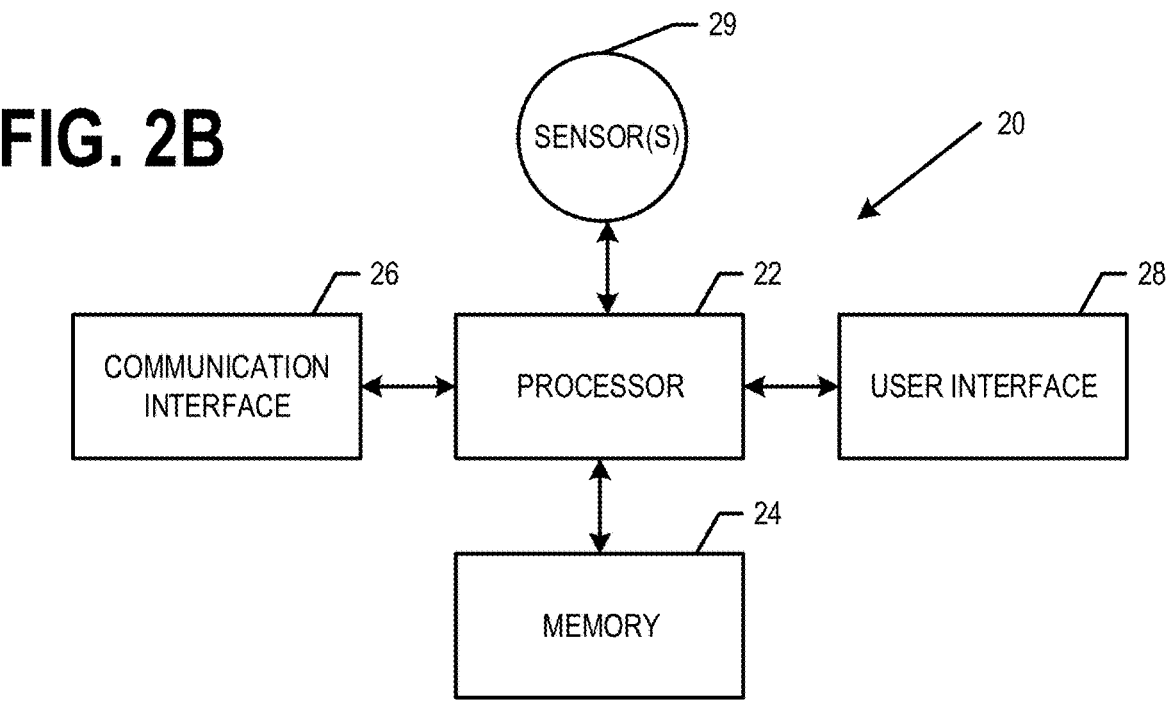
Figure 2C:
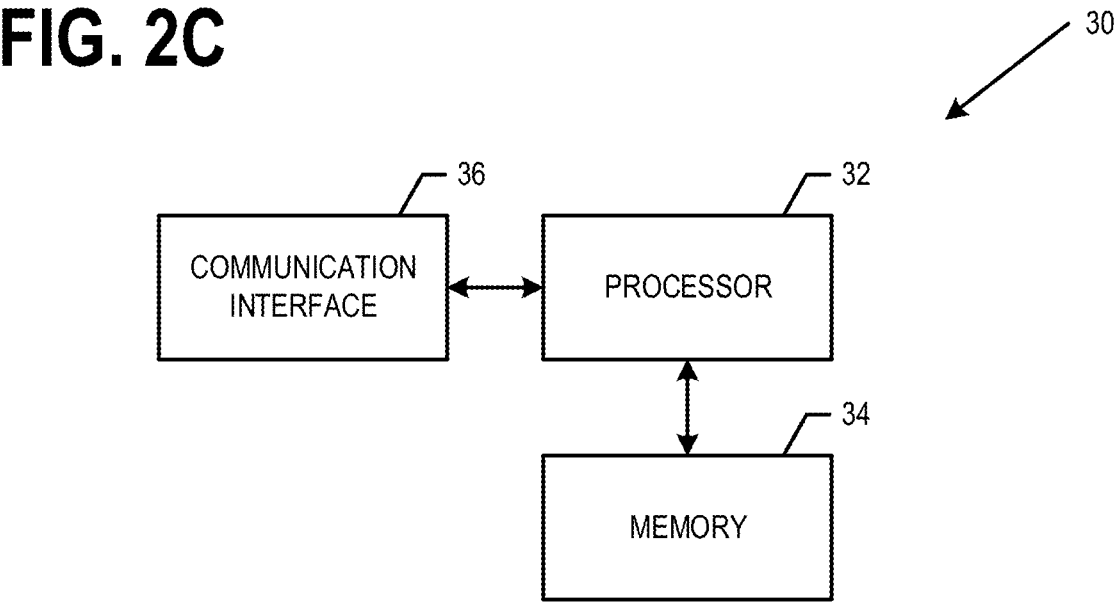
Figure 2D:
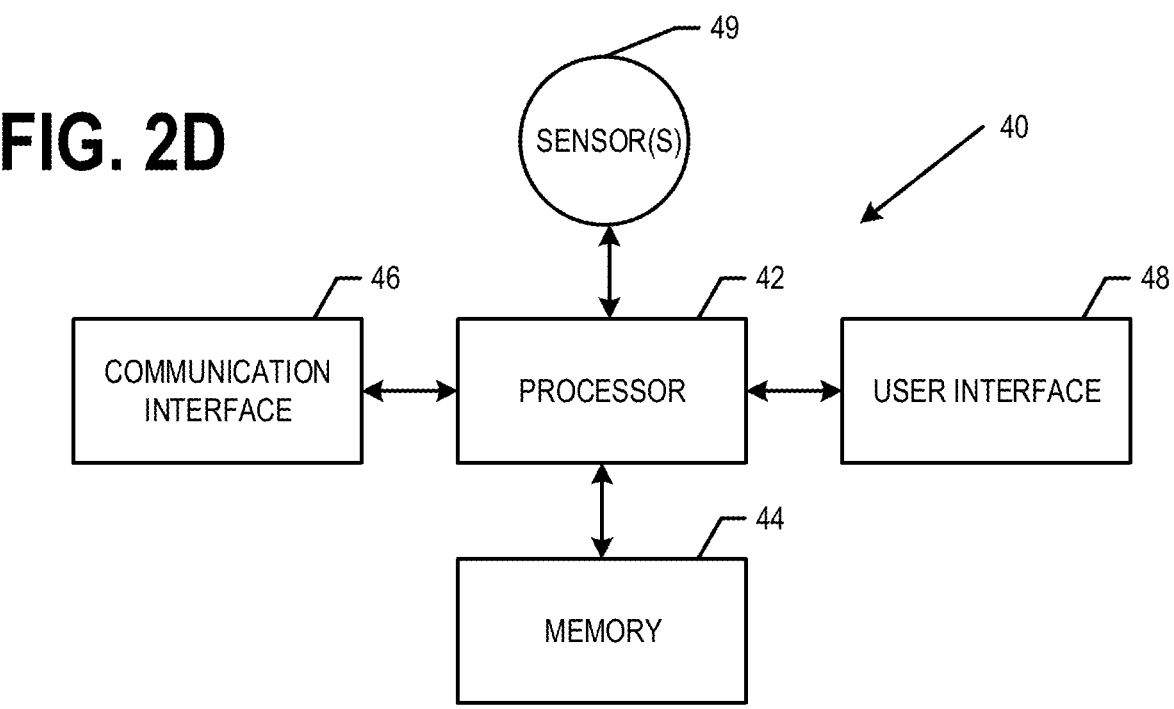
Figure 4:
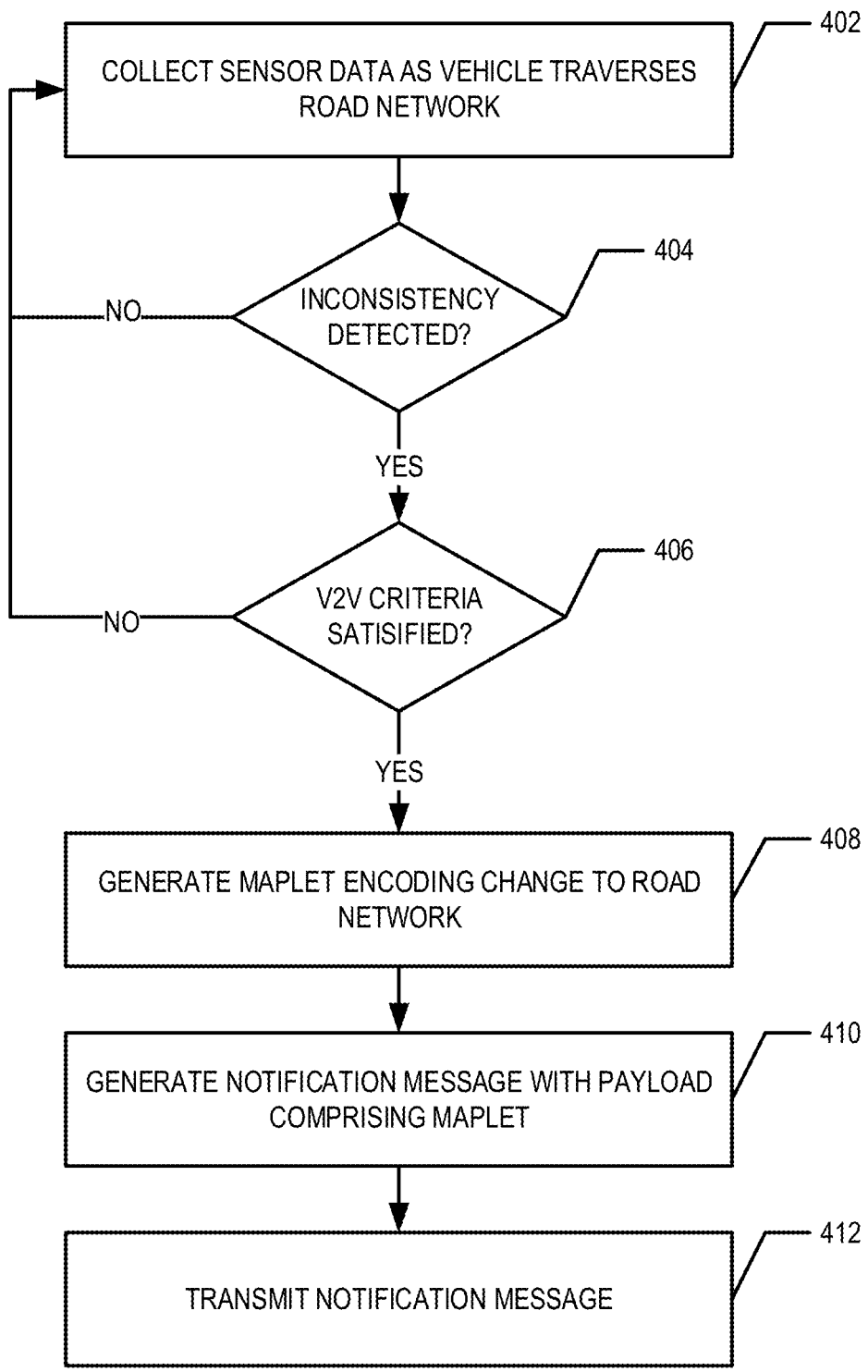
Figure 5:
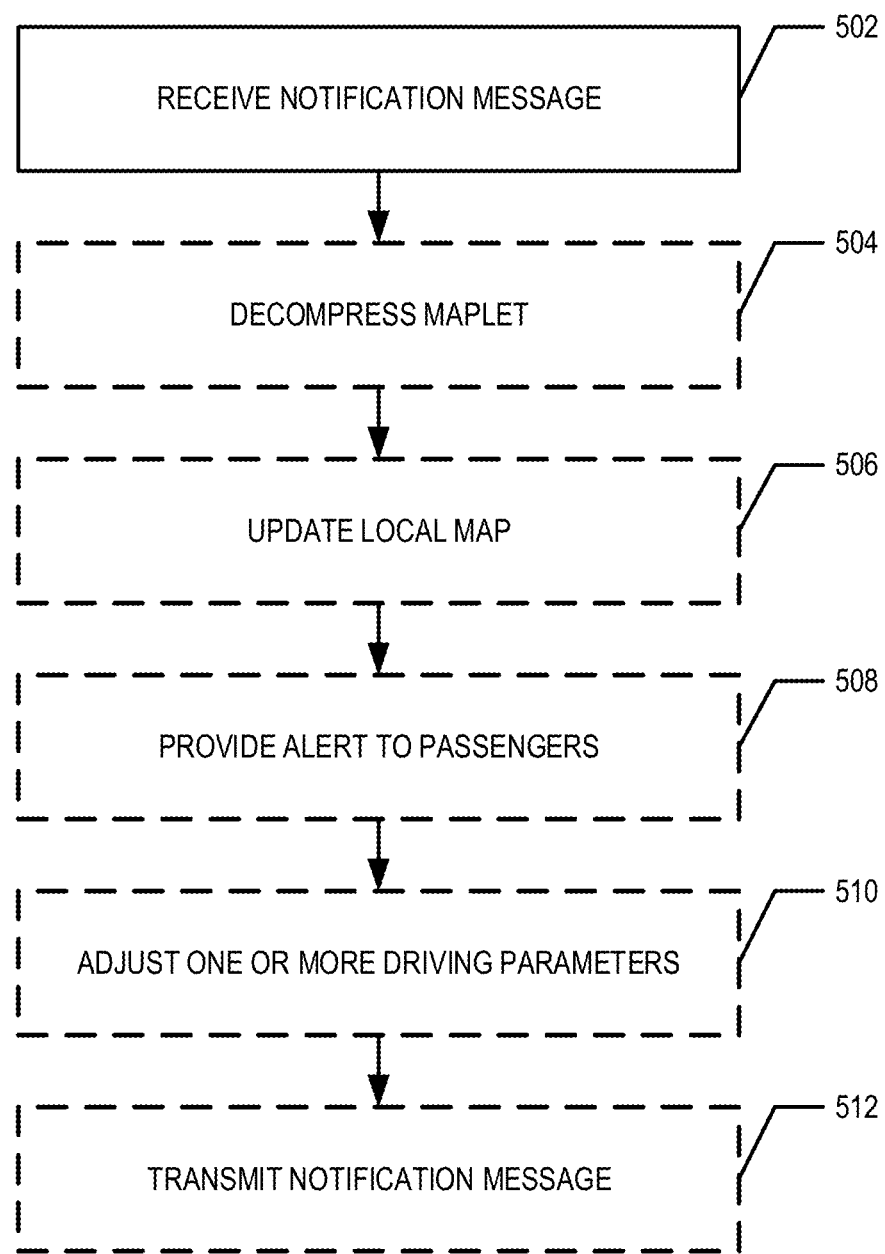
Figure 6:
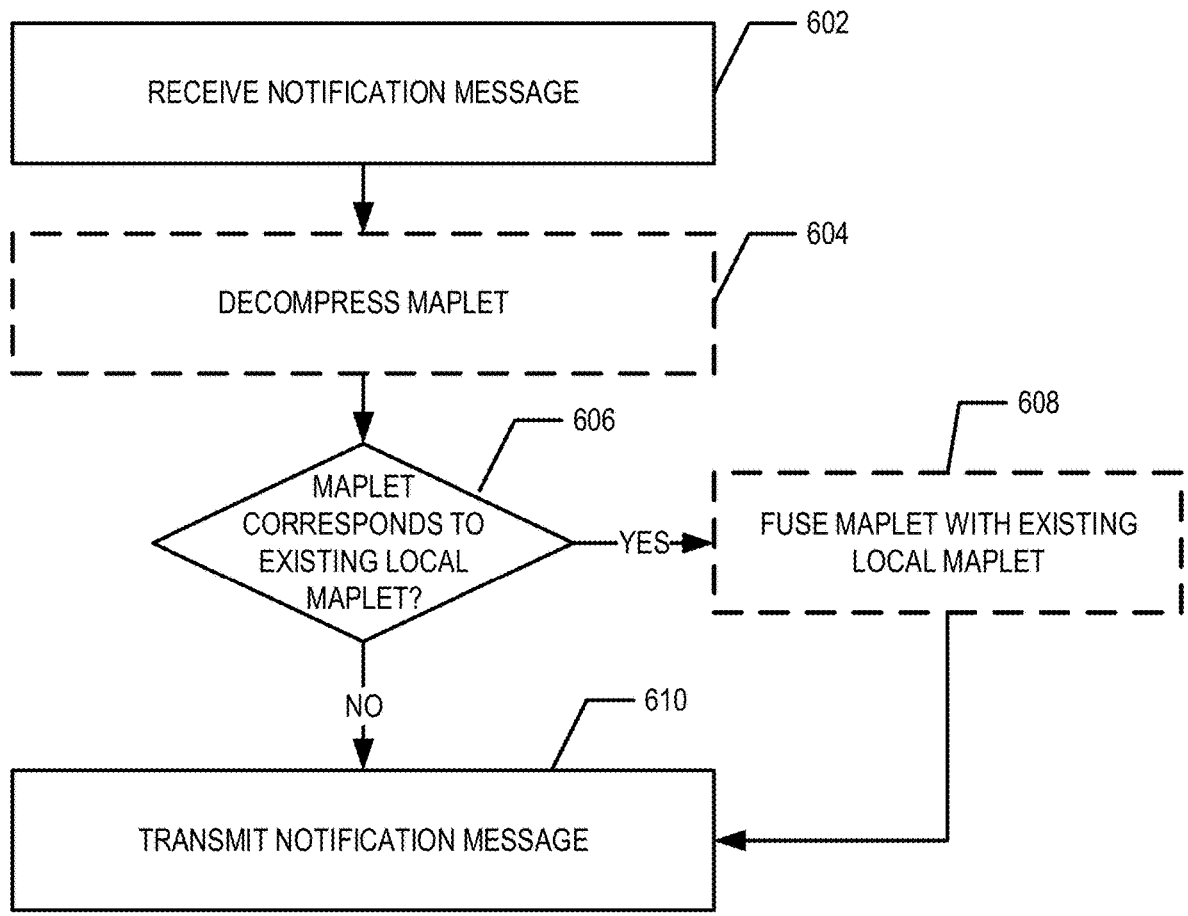
Figure 7:
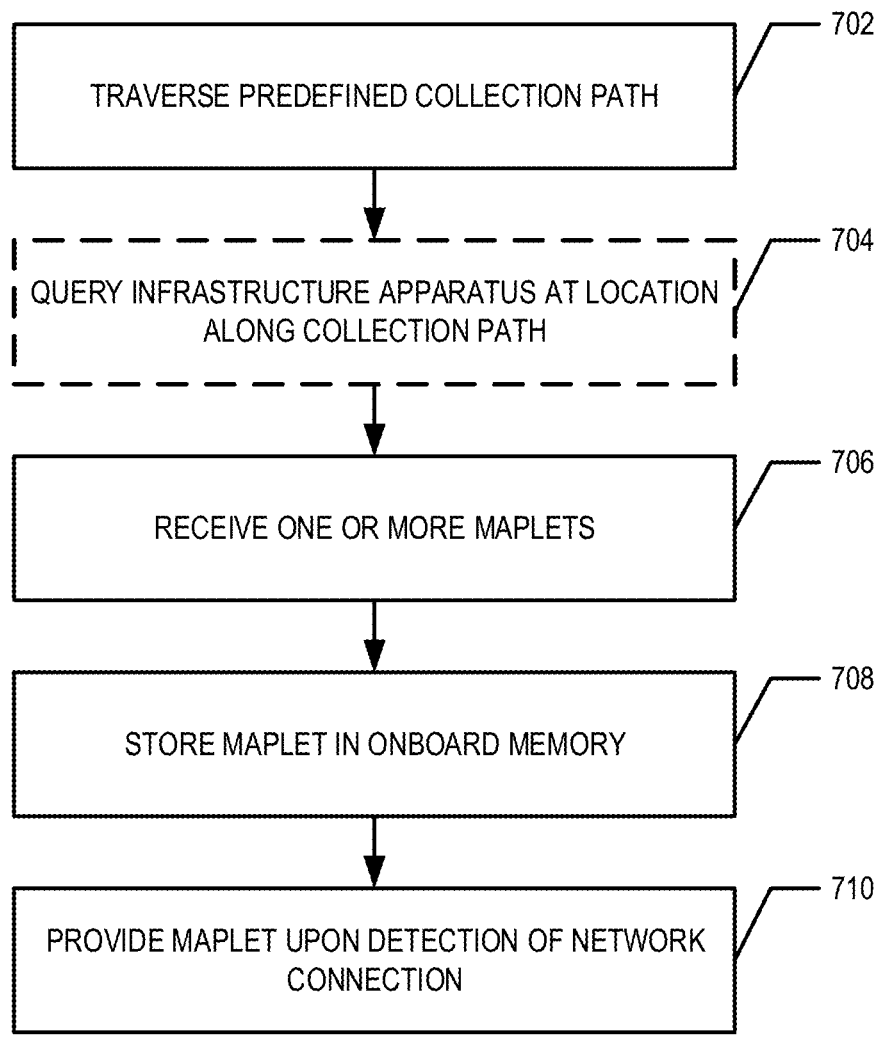
Figure 8:
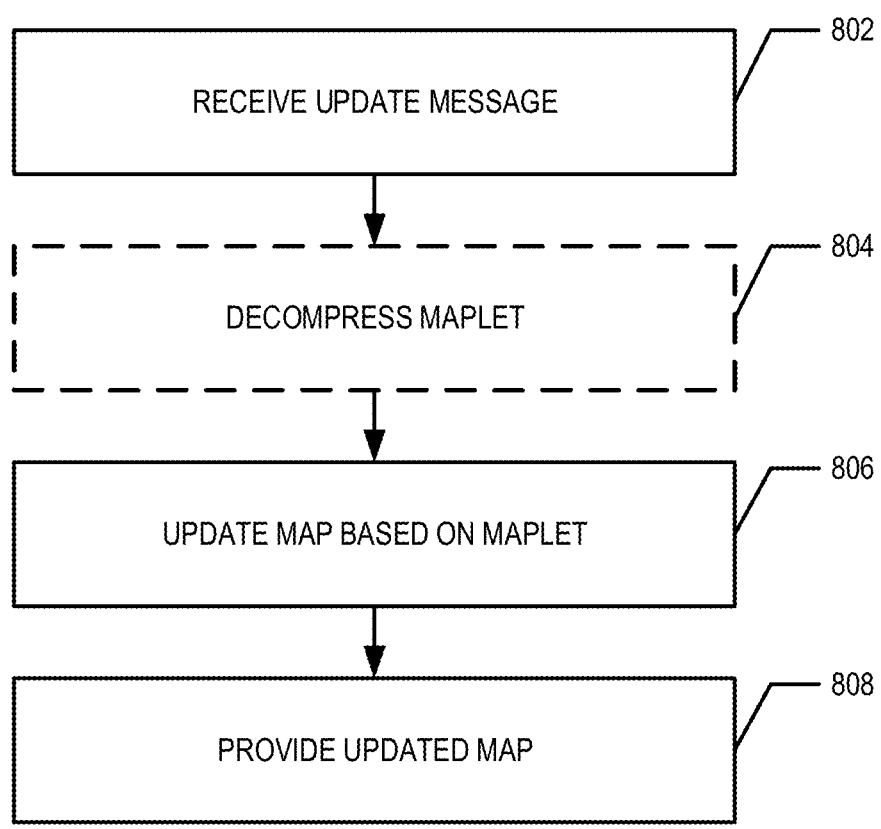

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a vehicle apparatus that may be specifically configured in accordance with an example embodiment;

FIG. 2C is a block diagram of an infrastructure apparatus that may be specifically configured in accordance with an example embodiment;

FIG. 2D is a block diagram of a collection apparatus that may be specifically configured in accordance with an example embodiment;

FIG. 3 is an example of a maplet entry corresponding to an observed stop sign, in accordance with an example embodiment;

FIG. 4 is a flowchart illustrating operations performed, such as by the vehicle apparatus of FIG. 2B to provide a notification message, in accordance with an example embodiment;

FIG. 5 is a flowchart illustrating operations performed, such as by a receiving vehicle apparatus of FIG. 2B in response to receiving a notification message, in accordance with an example embodiment;

FIG. 6 is a flowchart illustrating operations performed, such as by the infrastructure apparatus of FIG. 2C in response to receiving a notification message, in accordance with an example embodiment;

FIG. 7 is a flowchart illustrating operations performed, such as by the collection apparatus of FIG. 2D to collect one or more notification messages, in accordance with an example embodiment; and FIG. 8 is a flowchart illustrating operations performed, such as by the network apparatus of FIG. 2A to update a digital map, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided in accordance with an example embodiment for providing notifications regarding inconsistencies between current conditions of a portion of a road network (as detected via analysis of sensor information/data by a vehicle apparatus) and the representation of the road network provided by a digital map and/or portion thereof that is stored by the vehicle apparatus. In various embodiments, the vehicle apparatus may generate an update message to be transmitted to a network apparatus via the Internet, automotive cloud, and/or other network. If access to the Internet, automotive cloud, and/or other network is available, the vehicle apparatus may provide (e.g., transmit) the update message at that time. If access to the Internet, automotive cloud, and/or other network is not currently available, the vehicle apparatus may store the update message and provide (e.g., transmit) the update message once the vehicle apparatus is at a location where the Internet, automotive cloud, and/or other network is available. If the detected inconsistency satisfies one or more V2V criteria, the vehicle apparatus may generate a notification message. The notification message may be provided (e.g., transmitted) using a short and/or medium range communication protocol such that other vehicle apparatuses and/or infrastructure apparatuses in the vicinity (e.g., within the range of the short and/or medium range communication protocol) may receive the notification message. Such receiving vehicle apparatuses may then use the information/data provided by the notification message to perform one or more tasks. In various embodiments, the one or more tasks may be updating one or more tiles of a digital map stored locally by the receiving vehicle apparatus, triggering an alert to passengers of the vehicle, adjusting one or more driving parameters of an autonomous vehicle and/or an ADAS-enabled vehicle, and/or the like. In an example embodiment, the receiving vehicle apparatus may provide (e.g., transmit) the notification message via the short and/or medium range communication protocol.

In various embodiments, the notification message comprises an indication of the detected inconsistency. In an example embodiment, the notification message is a basic safety message (BSM). For example, the notification message may be a BSM as defined under intelligent transportation system (ITS) standards such as SAE J2735 or other ITS standards. For example, the short and/or medium range communication protocol may be a dedicated short range communications (DSRC) as defined by an ITS standard such as the SAE J2735 or other ITS standard. In an example embodiment, the indication of the detected inconsistency is provided as a maplet. A maplet is a data structure comprising abstracted, parameterized, fused representations of one or more environment elements detected in sensor information/data captured by one or more sensors of a vehicle apparatus. In an example embodiment, the data structure of the maplet further comprises a representation of the vehicle's trajectory history for a segment of a vehicle's trajectory. In an example embodiment, the segment of the vehicle's trajectory may correspond to a single vehicle ignition cycle. In various embodiments, the data structure of the maplet is a pre-defined, standardized data structure, as described in detail elsewhere herein.

In various embodiments, an infrastructure apparatus may receive a notification message provided (e.g., transmitted) by a vehicle apparatus (e.g., either the detecting vehicle apparatus or a receiving vehicle apparatus that was re-transmitting the notification message). The infrastructure apparatus may locally store the notification message and/or the indication of the detected inconsistency and continuously and/or periodically re-transmit the notification message such that vehicle apparatuses and/or collection apparatuses in the vicinity of the infrastructure apparatus may receive the notification message. In an example embodiment, the infrastructure apparatus may determine if a detected inconsistency indicated in a notification message corresponds to the same inconsistency as a previously received notification message and/or an existing indication of a detected inconsistency stored in the memory of the infrastructure apparatus. If an existing indication of a detected inconsistency is found to correspond to the same inconsistency as the detected inconsistency indicated in the received notification message, the two indications may be fused and/or one of the indications may be selected for storage and transmission.

In an example embodiment, a collection apparatus may traverse a path in the vicinity of one or more infrastructure apparatuses in one or more communication-limited portions of the road network and receive one or more notification messages from one or more infrastructure apparatuses and/or vehicle apparatuses. The collection apparatus may then provide the notification messages to a network apparatus for updating of the map information/data of the digital map once the collection apparatus is in a location where the collection apparatus can access the Internet, automotive cloud, and/or another computer network. In an example embodiment, a collection apparatus is onboard an autonomous or remotely controlled collection vehicle. In an example embodiment, the remotely controlled collection vehicle is a drone and/or can fly.

The network apparatus may be configured to receive notification messages and/or update messages via the Internet, automotive cloud, and/or the like update the digital map and/or portions thereof based on the information/data provided by the notification messages and/or update messages, and provide the updated digital map and/or one or more tiles of the updated digital map to one or more vehicle apparatuses. In an example embodiment, the digital map may be a high definition map that may be used for navigation functions for an autonomous, self-driving vehicle, an advanced driver assistances system (ADAS), and/or a human operator. For example, the digital map and/or portions thereof may be used to perform navigation functions such as localization, route determination, lane level route determination, lane maintenance, route guidance, lane level route guidance, provision of traffic information/data, provision of lane level traffic information/data and/or the like.

FIG. 1 provides an illustration of an example system that can be used in conjunction with various embodiments of the present invention. As shown in FIG. 1, the system may include one or more network apparatuses 10, one or more vehicle apparatuses 20 (e.g., 20A, 20B), wherein each vehicle apparatus 20 is disposed on a vehicle 5, one or more infrastructure apparatuses 30, wherein each infrastructure apparatus 30 is disposed on an infrastructure element 8, one or more collection apparatuses 40, wherein each collection apparatus 40 is disposed on a collection vehicle 3, one or more networks 50, and/or the like. In various embodiments, the vehicle apparatus 20, may be an in vehicle navigation system, vehicle control system, a mobile computing device, a mobile data gathering platform, and/or the like. For example, a vehicle apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the vehicle apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, the vehicle apparatus 20 is configured to autonomously drive a vehicle 5 and may perform multiple functions that are similar to those performed by a vehicle apparatus 20 configured to be an ADAS (e.g., lane keeping, lane change assistance, maintaining a lane, merging, etc.). In some embodiments, vehicle apparatus 20 may be onboard a personal vehicle, commercial vehicle, public transportation vehicle, fleet vehicle, and/or other vehicle. In various embodiments, the vehicle apparatus 20 may be a smartphone, tablet, personal digital assistant (PDA), personal computer, desktop computer, laptop, and/or other mobile computing device. In an example embodiment, a vehicle apparatus 20 is onboard a vehicle 5 and is used to perform one or more navigation functions corresponding to the vehicle 5 traversing at least a portion of a road network. In an example embodiment, the network apparatus 10 may be a server, group of servers, distributed computing system, and/or other computing system. For example, the network apparatus 10 may be in communication with one or more vehicle apparatuses 20, one or more infrastructure apparatuses 30, one or more collection apparatuses 40, and/or the like via one or more wired or wireless networks 50. In an example embodiment, an infrastructure apparatus 30 is secured to and/or a part of an infrastructure element 8 of the road network. In an example embodiment, the infrastructure element is a traffic light, a road sign, a street light, a pedestrian traffic signal, and/or other infrastructure element of the road network. In an example embodiment, a collection apparatus 40 is onboard a collection vehicle 3. In an example embodiment, the collection vehicle 3 is a drone and/or other autonomously or remotely controlled aircraft.

In an example embodiment, a network apparatus 10 may comprise components similar to those shown in the example network apparatus 10 diagrammed in FIG. 2A. In an example embodiment, the network apparatus 10 is configured to receive update and/or notification messages, update a digital map and/or tiles of the digital map based on the update and/or notification messages, provide one or more updated map tiles to one or more vehicle apparatuses, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In an example embodiment, a vehicle apparatus 20 is onboard a vehicle 5. In an example embodiment, the vehicle apparatus 20 may be configured to capture sensor information/data as the vehicle 5 traverses at least a portion of the road network. The vehicle apparatus 20 may be configured to analyze the sensor information/data in at least near real time (e.g., real time or near real time) with respect to the collection of the sensor information/data, identify and/or detect any inconsistencies between results of the analysis of the sensor information/data and the map information/data of one or more map tiles stored in the memory of the vehicle apparatus. The vehicle apparatus 20 may be further configured to determine if a detected inconsistency satisfies one or more V2V criteria, and responsive to determining that the detected inconsistency satisfies one or more V2V criteria, generate and provide (e.g., transmit) a notification message via a short and/or medium range communication protocol. In various embodiments, the vehicle apparatus 20 may further provide an update message at a time when the Internet, an automotive cloud, and/or other computer network is accessible. For example, the vehicle apparatus 20 may comprise and/or be in communication with one more sensors onboard the vehicle 5 for capturing sensor information/data that encodes information/data corresponding to a road network and/or the environment surrounding at least a portion of the road network. The sensor information/data may comprise location information/data indicating a location (e.g., geolocation such as latitude and longitude and/or the like) of the vehicle 5 and/or vehicle apparatus 20 when the corresponding sensor information/data was captured. For example, an instance of location information/data may comprise a time stamp indicating the time that the instance of location information/data was gathered, collected, captured and/or the like. In an example, an instance of location information/data may comprise a position and/or heading corresponding to a location and/or heading of the vehicle 5 at the time the instance of location information/data was gathered, collected, captured, and/or the like.

In an example embodiment, as shown in FIG. 2B, the vehicle apparatus 20 may comprise a processor 22, memory 24, a communications interface 26, a user interface 28, one or more sensors 29 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, as shown in FIG. 2C, the infrastructure apparatus 30 may comprise a processor 32, memory 34, a communications interface 36, and/or other components configured to perform various operations, procedures, functions or the like described herein. In at least some example embodiments, the memory 34 is non-transitory. In an example embodiment, the infrastructure apparatus 30 is secured to and/or a part of an infrastructure element 8 of the road network. In an example embodiment, the infrastructure element 8 is a stationary and/or non-mobile element such as a traffic light, traffic sign, pedestrian signal, street light, and/or the like.

In an example embodiment, a collection apparatus 40 is onboard a collection vehicle 3. In an example embodiment, the collection apparatus 40 may be configured to traverse a path in the vicinity of one or more infrastructure apparatuses 30 in one or more communication-limited portions of the road network and receive one or more notification messages from one or more infrastructure apparatuses 30 and/or vehicle apparatuses 20. The collection apparatus 40 may then provide the notification messages to a network apparatus 10 for updating of the map information/data of the digital map at a time when the collection apparatus 40 is in a location where the collection apparatus 40 can access the Internet, automotive cloud, and/or another computer network. In an example embodiment, as shown in FIG. 2D, the collection apparatus 40 may comprise a processor 42, memory 44, a communications interface 46, a user interface 48, one or more second probe sensors 49 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the second probe apparatus 40 to determine one or more features of the corresponding collection vehicle's 3 surroundings and/or monitor the collection vehicle's 3 operating parameters), and/or other components configured to perform various operations, procedures, functions or the like described herein. In at least some example embodiments, the memory 44 is non-transitory.

In an example embodiment, the network apparatus 10 may be in communication with one or more of vehicle apparatuses 20, one or more infrastructure apparatuses 30, and/or one or more collection apparatuses 40 via one or more wired and/or wireless networks 50. For example, each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, short and/or medium range communications, and/or the like. In some embodiments, a network 50 may comprise the automotive cloud, digital transportation infrastructure (DTI), radio data system (RDS)/high definition (HD) radio or other digital radio system, and/or the like. For example, a vehicle apparatus 20, infrastructure apparatus 30, and/or collection apparatus 40 may be in communication with a network apparatus 10 via the network 50. For example, a vehicle apparatus 20, infrastructure apparatus 30, and/or collection apparatus 40 may communicate with the network apparatus 10 via a network, such as the Cloud. For example, the Cloud may be a computer network that provides shared computer processing resources and data to computers and other devices connected thereto. For example, the vehicle apparatus 20, infrastructure apparatus 30, and/or collection apparatus 40 may be configured to receive one or more map tiles of a digital map from the network apparatus 10 or another map service connected via the network 50, traffic information/data (embedded in a map tile of a digital map and/or separate therefrom), and/or provide notification and/or update messages to the network apparatus 10, and/or the like. In an example embodiment, a vehicle apparatus 20 may communicate with another vehicle apparatus 20, infrastructure apparatus 30, and/or collection apparatus 40 via a short and/or medium range communication protocol.

Certain example embodiments of the vehicle apparatus 20, infrastructure apparatus 30, collection apparatus 40 and/or the network apparatus 10 are described in more detail below with respect to FIGS. 2A, 2B, 2C, and 2D.

II. Example Operation

Example embodiments provide methods, apparatus, systems, computer program products, and/or the like for detecting inconsistencies between the current condition of a road network and map information/data of a digital map. In various embodiments, the current condition of the road network is represented by sensor information/data captured by a vehicle apparatus 20 as the corresponding vehicle 5 traverses at least a portion of the road network and/or the results of the analysis of the sensor information/data. In various embodiments, the vehicle apparatus 20 stores one or more tiles of a digital map in memory 24. The detected inconsistencies are inconsistencies between the map information/data of the one or more map tiles stored in the memory 24 and the captured sensor information/data and/or the results of the analysis of the sensor information/data.

In various embodiments, the vehicle apparatus 20 may generate an update message comprising an indication of the detected inconsistency and at a time when the vehicle apparatus 20 can access the network 50, the vehicle apparatus may provide (e.g., transmit) the update message such that the network apparatus 10 may receive the update message and update the digital map based thereon. In an example embodiment, if the vehicle apparatus 20 cannot access the network 50 when the update message is generated, the vehicle apparatus 20 may provide (e.g., transmit) the update message in response to detecting that the vehicle apparatus 20 can access the network 50. In various embodiments, responsive to determining that the detected inconsistency satisfies one or more V2V criteria, the vehicle apparatus 20 may generate a notification message comprising an indication of the detected inconsistency and transmit the notification message via a short and/or medium range communication protocol.

In various embodiments, the V2V criteria may correspond to inconsistencies that may affect the performance and/or result of one or more navigation functions by a vehicle apparatus 20. For example, if the detected inconsistency is that, according to the sensor information/data and/or a result of the analysis thereof, a lane and/or segment of road way is impassable due to an accident, road work, a weather incident (e.g., the lane is flooded, covered in snow, covered in mud/dirt, and/or the like), and/or the like, the detected inconsistency may satisfy the V2V criteria because the impassability of the lane and/or segment of the road way may affect the routing and/or lane level routing of the vehicle 5. In another example, if the detected inconsistency would affect the speed at which an autonomous vehicle would traverse a portion of the road network (e.g., due to weather conditions, construction workers and/or emergency crews on site, road conditions, and/or the like) the detected inconsistency may satisfy the V2V criteria. Thus, the V2V criteria may be configured to determine, identify, and/or the like if a detected inconsistency would affect the performance and/or result of one or more navigation functions by a vehicle apparatus 20 in the vicinity of the detected inconsistency. For example, if a detected inconsistency satisfies one or more V2V criteria, the detected inconsistency is likely to affect the performance and/or result of one or more navigation functions of a vehicle apparatus 20 in the vicinity of the detected inconsistency. For example, if the result of a navigation function is different when completed using knowledge of the detected inconsistency compared to when the navigation function is completed using only the map information/data of the digital map, then the detected inconsistency is likely to affect the performance and/or result of a navigation function, in an example embodiment. In an example embodiment, the V2V criteria are configured to identify detected inconsistencies that may pose a safety hazard for a vehicle traversing the road network in the vicinity of the detected inconsistency.

In various embodiments, a notification and/or update message comprises an indication of the detected inconsistency. In various embodiments, the indication of the detected inconsistency may be a result of the analysis of the sensor information/data. In an example embodiment, the indication of the detected inconsistency is a maplet. In various embodiments a maplet is a data structure comprising abstracted, parameterized, fused representations of one or more environment elements detected in sensor information/data captured by one or more sensors of a vehicle apparatus. In an example embodiment, the data structure of the maplet further comprises a representation of the vehicle's trajectory history for a segment of a vehicle's trajectory. In an example embodiment, the segment of the vehicle's trajectory may correspond to a single vehicle ignition cycle. In various embodiments, the data structure of the maplet is a predefined, standardized data structure. In various embodiments, a maplet is generated in at least near real time with respect to the capturing of the sensor information/data that the maplet is generated based on.

In various embodiments, a maplet is a local, at least near real time, map-like encapsulation of the environment surrounding a vehicle apparatus 20. In an example embodiment, a maplet is a standardized data model and data format for capturing an environmental model of a short distance of a road way. In an example embodiment, a maplet is generated, created, and/or the like based solely on the sensor information/data captured by the one or more sensors 29 of the vehicle apparatus 20. In an example embodiment, the sensor information/data may comprise two or more observations of a particular environment element. The two or more observations of the particular environment element may be fused, combined, and/or the like, to generate, create and/or the like a model element for the particular environment element for the environment model encapsulated by the maplet. For example, the sensors 29 may capture a plurality of observations of a road sign during the time period that sensor information/data is being captured and/or collected for a first maplet. The plurality of observations of the road sign may be fused, combined, and/or the like to generate a single model element corresponding to the road sign for the environment model of the first maplet. For example, the location (e.g., geolocation, orientation, and/or the like) of the road sign (e.g., a center point of the face of the road sign and/or the direction in which the road sign is facing) may be determined by averaging the determined location of the road sign for each observation of the road sign. For example, a maplet may provide a small package of locally correlated, spatially associated feature observations.

In various embodiments, the maplet provides a format for reporting sensor information/data relative to each other and relative to trajectory and/or pose path of the corresponding vehicle 5. The vehicle apparatus 20 may generate and/or create an environment model based on the analysis and/or processing of the sensor information/data and based on the trajectory and/or pose path of the vehicle. In various embodiments, the sensor information/data that is buffered for a small stretch of the road (e.g., in memory 24) such that the environment model may be generated and/or created based on a plurality of observations of the environment surrounding the vehicle 5. In various embodiments, the use of a plurality of observations may be used to remove false positive detections of features and/or to increase the accuracy of locations and/or the like of detected features.

In various embodiments, a maplet may comprise model elements corresponding to detected and/or observed environment elements that are represented by attributes such as one or more coordinates, a classification, a feature identifier identifying the feature within the map information/data of the digital map, a color, a time stamp corresponding to when the sensor information/data was captured, a covariance matrix, one or more size parameters, orientation, reflectivity parameters, and/or the like. For example, FIG. 3 illustrates an example maplet entry for a stop sign, in accordance with an example embodiment. A maplet may comprise a maplet entry for each feature observed and/or identified in/from the sensor information/data. The maplet may also comprise a series of trajectory entries corresponding to the location and/or pose of the vehicle 5 at instances during the time the sensor information/data used to generate the maplet was captured. For example, the trajectory entries may comprise pose points at spatial frequency of one point per meter of forward travel, or at a temporal frequency of one point per 10 seconds, whichever provides the highest spatial sampling frequency, in an example embodiment. In various embodiments, the information/data used to generate the pose path is only determined based on sensor information/data (e.g., GNSS sensor information/data, IMU information/data, and/or the like) and is not based on map information/data.

In various embodiments, maplets may be compressed for transmission. For example, the vehicle apparatus 20 may compress a maplet as part of the generation of an update and/or notification message. In various embodiments, a maplet's data footprint is in the range of approximately 1 kilobyte to 10 kilobytes per linear kilometer of vehicle travel. In an example embodiment, the maplet is then compressed to reduce the use of bandwidth needed to transmit the maplet. In an example embodiment, prior to the compression of the maplet, the maplet may be stored in a protobuf data structure, such as that defined by SDII-Vx and/or other ITS standard. In various embodiments, the compression of the maplet is configured to meet certain compression ratio goals while not exceeding certain maximum allowed data loss levels. The compressed maplet may then be transmitted as part of a notification and/or update message.

In an example embodiment, an update message may be provided to an original equipment manufacturer (OEM) cloud corresponding to the OEM of the vehicle 5. The OEM cloud (e.g., one or more network apparatuses 10 of the OEM cloud) may decompress the maplet into SDII-Vx format or another format and/or process the maplet. The maplet may then be provided to one or more other network apparatuses 10 (e.g., via another cloud, the Internet, and/or another communication network) in an uncompressed and/or lossless compression compressed state. The network apparatus 10 may then analyze and/or process the maplet as part of a process for updating the map information/data of a digital map.

In various embodiments, a notification message may be particularly configured and/or formatted for transmission via a short or medium range communication protocol. For example, the notification message may be a BSM configured and/or formatted for transmission via DRSC. For example, the notification message may be configured and/or formatted for transmission via a short or medium range communication protocol that has a range of approximately 1000 meters in an example embodiment.

Providing a Notification Message

FIG. 4 provides a flowchart of operations performed, such as by the vehicle apparatus 20A to provide a notification message. Starting at block 402, the vehicle apparatus 20A traverses at least a portion of the road network. As the vehicle apparatus 20A traverses the at least a portion of the road network, the vehicle apparatus 20A causes, instructs, and/or the like one or more sensors 29 to collect, generate, capture, and/or the like, sensor information/data. For example, the sensor information/data may correspond to the environment surrounding the vehicle 5 that the vehicle apparatus 20A is onboard, corresponds to the position and/or orientation of the vehicle 5 (e.g., with respect to its environment), and/or corresponding to the vehicle 5 itself. In various embodiments, the one or more sensors 29 may collect, generate, capture, and/or the like, a portion of the sensor information/data at a predetermined rate such as at spatial frequency of one point per meter of forward travel, or at a temporal frequency of one point per 10 seconds, whichever provides the highest spatial sampling frequency, in an example embodiment. For example, the vehicle apparatus 20A may comprise means, such as processor 22, memory 24, sensors 29, and/or the like, for collecting, generating, capturing, and/or the like sensor information/data as the corresponding vehicle 5 traverses at least a portion of the road network.

At block 404, the sensor information/data is processed, analyzed, and/or the like. For example, the vehicle apparatus 20A processes, analyzes, and/or the like the captured sensor information/data. For example, the vehicle apparatus 20A may comprise means, such as the processor 22, memory 24, and/or the like, for processing, analyzing, and/or the like the captured sensor information/data. In various embodiments, the sensor information/data is processed, analyzed, and/or the like in at least near real time (e.g., real time or near real time) with respect to the capturing of the sensor information/data. In various embodiments, the sensor information/data comprises location information/data corresponding to the location, pose, orientation, and/or the like of the corresponding vehicle 5; optical and/or infrared images; lidar and/or radar point clouds; IMU information/data; and/or the like. In various embodiments, the sensor information/data may be processed, analyzed, and/or the like as part of generating an environment model. For example, the vehicle apparatus 20A may generate an at least near real time local environment model based on the sensor information/data. In various embodiments, the local environment model corresponds to the environment surrounding the vehicle 5 that was viewable and/or observable by the one or more sensors 29 at the time the sensor information/data was captured, collected, generated, and/or the like. For example, an environment model may comprise, describe, and/or the like environment elements in the environment surrounding the vehicle such as traffic signs, traffic signals, lane lines and/or other road markings, buildings and bushes located near the road way, other vehicles on the roadway, and/or the like. For example, an environment model may comprise one or more model elements that each correspond to and/or represent an environment element present in the environment surrounding the vehicle.

In various embodiments, the sensor information/data may be processed, analyzed, and/or the like to determine if there are any inconsistencies between the environment model generated based on the sensor information/data and the map information/data of one or more tiles of a digital map stored in the memory 24. For example, the vehicle apparatus 20A may determine if there are any inconsistencies between the model elements in the generated environment model and the corresponding elements described by the map information/data locally stored in memory 24. For example, the vehicle apparatus 20A may determine if the location of a lane line in the generated environment model is consistent with the location of the corresponding lane line in the map information/data locally stored in memory 24. For example, the location, classification, orientation, size, and/or other attributes of the model element may be compared to the corresponding elements of the map information/data to identify and/or detect any inconsistencies between the environment model and the map information/data.

In another example, the vehicle apparatus 20A may determine if there are any model elements in the generated environment model for which a corresponding element in the map information/data is expected but is not available in the map information/data. For example, it would not be expected that the map information/data would comprise an element corresponding to another vehicle on the road way. However, it would be expected that the map information/data would comprise an element corresponding to lane lines and/or other lane markers, cross-walks, traffic signals, traffic signs, the edge of the pavement, and/or other static items in the environment of the road way. Thus, if the generated environment model comprises a cross-walk that is not present in the map information/data, the vehicle apparatus 20A may determine a cross-walk was added to the road network since the map information/data of the digital map was last updated. The presence of the cross-walk in the environment model may be identified and/or detected as an inconsistency between the environment model generated based on the sensor information/data and the map information/data stored locally by the vehicle apparatus 20A (e.g., in memory 24).

In another example, the vehicle apparatus 20A may determine if there are any elements in the map information/data that are absent in the generated environment model. For example, if the map information/data indicates that the sensor information/data should include information/data corresponding to a stop sign, it may be determined that the road network was updated to remove the stop sign or the stop sign was unintentionally removed (e.g., hit by a vehicle, and/or the like). Thus, the missing stop sign may be identified and/or detected as an inconsistency between the environment model generated based on the sensor information/data and the map information/data stored locally by the vehicle apparatus 20A (e.g., in memory 24).

If, at block 404, no inconsistencies between the environment model generated based on the sensor information/data and the map information/data stored locally by the vehicle apparatus 20A are detected, the process may return to block 402. If, at block 404, one or more inconsistencies are detected between the environment model generated based on the sensor information/data and the map information/data stored locally by the vehicle apparatus 20A, the vehicle apparatus 20A may generate an update message comprising an indication of the one or more detected inconsistencies and provide the update message at a time when the vehicle apparatus 20A can access the Internet, automotive cloud, and/or other communication network. For example, if the vehicle apparatus 20A can access the Internet, automotive cloud, and/or other communication network 50 at the time the update message is generated, the vehicle apparatus 20A may immediately transmit (e.g., via communications interface 26) the update message via the Internet, automotive cloud, and/or other communication network 50. For example, if the vehicle apparatus 20A cannot access the Internet, automotive cloud, and/or other communication network 50 at the time the update message is generated, the vehicle apparatus 20A may store the update message (e.g., in memory 24) and, at a later time, responsive to determining, by the vehicle apparatus 20A, that the vehicle apparatus 20A can access the Internet, automotive cloud, or other communication network 50, the vehicle apparatus 20A may transmit (e.g., via communications interface 26) the update message via the Internet, automotive cloud, and/or other communication network 50. The update message may be received by the network apparatus 10. In an example embodiment, the network apparatus 10 may update the map information/data based on the indication of the detected inconsistency provided by the update message. In an example embodiment, the indication of the detected inconsistency may be a maplet.

If, at block 404, one or more inconsistencies are detected between the environment model generated based on the sensor information/data and the map information/data stored locally by the vehicle apparatus 20A, the vehicle apparatus 20A may determine if any of the detected inconsistencies satisfy one or more V2V criteria, at block 406. For example, the vehicle apparatus 20A may comprise means, such as processor 22, memory 24, and/or the like, for determining if any of the detected inconsistencies satisfy one or more V2V criteria (e.g., stored and/or accessed from memory 24). For example, as described above, the one or more V2V criteria may be configured to determine and/or identify if a detected inconsistency is likely to affect the performance and/or results of one or more navigation functions that could be performed by a vehicle apparatus 20 if the vehicle apparatus 20 was in the vicinity of the detected inconsistency. For example, continuing with the example of the added cross-walk, an autonomous vehicle may change one or more driving parameters (e.g., reduce speed) near cross-walks. Thus, the addition of the cross-walk would affect the performance and/or result of a navigation function performed by such an autonomous vehicle in the vicinity of the detected inconsistency. In another example, if one or more lanes of traffic were not traversable (e.g., were washed out by flooded, were flooded, and/or the like), the inconsistency in the status of the lanes of traffic (e.g., from normal traffic lanes to non-traversable lanes) would be likely to affect the performance and/or result of a navigation function performed by such a vehicle in the vicinity of the detected inconsistency and therefore would satisfy one or more V2V criteria. The term "vicinity" is used herein to mean within and/or will shortly enter (e.g., within the next ten seconds, thirty seconds, minute, five minutes, and/or the like) the range of the short or medium range communication protocol used to provide a notification message.

If, at block 406, it is determined that none of the detected inconsistencies satisfy a V2V criterion, the process returns to block 402. If it is determined, at block 406, that at least one of the detected inconsistencies satisfies one or more V2V criteria, the process continues to block 408. At block 408, an indication of at least one of the one or more detected inconsistencies is generated. For example, the indication of the at least one of the one or more detected inconsistencies may comprise an indication of each detected inconsistency, an indication of each detected inconsistency that satisfied one or more V2V criteria, an encapsulation of the environment model, the entire environment model (e.g., as represented, defined, and/or described by a set of attributes corresponding to each model element), and/or the like. The indication of at least one of the one or more detected inconsistencies is also referred to herein as the indication of the detected inconsistency. In various embodiments, the indication of the detected inconsistency comprises information/data that may be used by a receiving vehicle apparatus 20B to, in addition to map information/data stored by the receiving vehicle apparatus 20B, perform one or more navigation functions such that the navigation functions take into account the at least one of the one or more detected inconsistencies that satisfied one or more V2V criteria. For example, the vehicle apparatus 20A may generate an indication of the detected inconsistency. For example, the vehicle apparatus 20A may comprise means, such as the processor 22, memory 24, and/or the like, for generating an indication of the detected inconsistency.

In an example embodiment, the indication of the detected inconsistency comprises a maplet. A maplet is a data structure comprising abstracted, parameterized, fused representations of one or more environment elements detected in sensor information/data captured by one or more sensors of a vehicle apparatus. For example, the maplet may comprise one or more attributes defining and/or describing a model element of the environment model generated based on the sensor information/data that is inconsistent with the map information/data stored by the vehicle apparatus 20A (e.g., in memory 24). In an example embodiment, the maplet comprises one or more attributes defining and/or describing each of a plurality of model elements of the environment model. For example, the maplet may be a local, at least near real time, map-like encapsulation of the environment model generated based on the sensor information/data and representing the environment surrounding the vehicle apparatus 20A. In an example embodiment, a maplet is a standardized data model and data format for capturing an environmental model of a short distance of a road way.

In an example embodiment, the data structure of the maplet further comprises a representation of the vehicle's trajectory history for a segment of a vehicle's trajectory. In an example embodiment, the segment of the vehicle's trajectory may correspond to a single vehicle ignition cycle. For example, the segment of the vehicle's trajectory may correspond to one second, five seconds, twenty seconds, thirty seconds, forty-five seconds, one minute, two minutes, three minutes, five minutes and/or the like of the vehicle's trajectory through at least a portion of the road network. For example, the segment of the vehicle's trajectory may correspond to one meter, two meters, five meters, ten meters, fifteen meters, twenty meters, and/or the like of forward travel along the vehicle's trajectory through at least a portion of the road network. In various embodiments, the data structure of the maplet is a predefined, standardized data structure. In various embodiments, a maplet is generated in at least near real time with respect to the capturing of the sensor information/data that the maplet and/or environment model is generated based on.

At block 410, a notification message is generated with the indication of the detected inconsistency as the payload. For example, the vehicle apparatus 20A may generate a notification message that comprises the indication of the detected inconsistency. For example, the vehicle apparatus 20A may comprise means, such as processor 22, memory 24, and/or the like, for generating a notification message that comprises the indication of the detected inconsistency. In an example embodiment, the notification message is a BSM. For example, the notification message may be a BSM as defined under intelligent transportation system (ITS) standards such as SAE J2735 or other ITS standards. For example, the short and/or medium range communication protocol may be a dedicated short range communications (DSRC) as defined by an ITS standard such as the SAE J2735 or other ITS standard. For example, the notification message may be a BSM comprising a maplet. In an example embodiment, the maplet and/or other indication of the detected inconsistency may be compressed. For example, the vehicle apparatus 20A may compress the maplet and/or other indication of the detected inconsistency such that the notification message comprises a compressed maplet and/or other indication of the detected inconsistency.

At block 412, the notification message is transmitted and/or broadcasted. For example, the vehicle apparatus 20A transmits the notification message via a short or medium range communication protocol. For example, the vehicle apparatus 20A may comprise means, such as processor 22, memory 24, communications interface 26, and/or the like, for transmitting the notification message via a short or medium range communication protocol. In an example embodiment, the notification message is transmitted via DSRC. In various embodiments, the vehicle apparatus 20A transmits the notification message continuously, periodically, and/or the like for a predefined period of time and/or within a predefined distance of the location of the detected inconsistency. For example, the vehicle apparatus 20A may transmit the notification message every five seconds, ten seconds, fifteen seconds, twenty seconds, thirty seconds, forty-five seconds, and/or minute for a predefined time period of five minutes, ten minutes, and/or the like, in an example embodiment. In an example embodiment, the vehicle apparatus 20A may transmit the notification message every five seconds, ten seconds, fifteen seconds, twenty seconds, thirty seconds, forty-five seconds, and/or minute for as long as the vehicle apparatus 20A is within 500 meters, 1000 meters, 1500 meters, 2000 meters, a tenth of a mile, an eighth of a mile, a quarter of a mile, and/or the like of the location of the detected inconsistency.

Receiving a Notification Message

FIG. 5 provides a flowchart illustrating operations performed by a receiving vehicle apparatus 20B in response to receiving a notification message, in accordance with an example embodiment. Starting at block 502, a notification message is received. For example, the receiving vehicle apparatus 20B may receive a notification message. For example, the receiving vehicle apparatus 20B may comprise means, such as processor 22, memory 24, communications interface 26, and/or the like for receiving a notification message. In various embodiments, a receiving vehicle apparatus 20B is a vehicle apparatus 20 that receives a notification message. For example, the receiving vehicle apparatus 20B may receive the notification message via a short or medium range communication protocol such as, for example, DSRC. The receiving vehicle apparatus 20B may, responsive to receiving the notification message, process the notification message, perform one or more navigation functions based on information/data provided by the notification message, retransmit the notification message, and/or the like.

At block 504, the notification message may be decompressed. For example, if the notification message comprises a compressed maplet and/or other indication of the detected inconsistency, the receiving vehicle apparatus 20B may decompress the compressed maplet and/or other indication of the detected inconsistency. For example, the receiving vehicle apparatus 20B may comprise means, such as the processor 22, memory 24, and/or the like, for decompressing a compressed maplet and/or other indication of the detected inconsistency.

At block 506, the map information/data stored locally by the receiving vehicle apparatus 20B may be updated based on information/data provided by the notification message. For example, the vehicle apparatus 20B may update the map information/data stored locally by the receiving vehicle apparatus 20B (e.g., in memory 24) based on the attributes corresponding to one or more model elements provided the maplet and/or other indication of the detected inconsistency. For example, the vehicle apparatus 20B may comprise means, such as processor 22, memory 24, and/or the like, for updating map information/data stored in the memory 24 based on the maplet and/or other indication of the detected inconsistency. In an example embodiment, one or more navigation functions may then be performed using the updated map information/data. For example, the receiving vehicle apparatus 20B may update a routing and/or a lane level routing for the vehicle 5 based on the updated map information/data.

At block 508, an alert may be provided to the passengers of the vehicle 5 corresponding to the receiving vehicle apparatus 20B. For example, the receiving vehicle apparatus 20B may provide an alert to the passengers of the vehicle 5. For example, the receiving vehicle apparatus 20B may comprise means, such as processor 22, memory 24, user interface 28, and/or the like, for providing an alert to the passengers of the vehicle 5. For example, if the notification message indicates that a lane and/or road segment is closed and/or blocked a visual or audible alert may be provided warning the passengers in the vehicle 5 of the closed and/or block lane and/or road segment (e.g., via a display and/or speaker of the user interface 28).

At block 510, one or more driving parameters of the vehicle 5 corresponding to the receiving vehicle apparatus 20B may be updated based on the notification message. For example, if the vehicle 5 corresponding to the receiving vehicle apparatus 20B is an autonomous vehicle or a vehicle having ADAS, the vehicle apparatus 20B may adjust one or more driving parameters of the vehicle 5. Some example driving parameters of a vehicle 5 that may be adjusted include speed, following distance (e.g., distance between the vehicle 5 and a vehicle in front of the vehicle 5), relationship between the vehicle 5 and the edges and/or center line of a lane, a route to a destination, and/or the like.

At block 512, the receiving vehicle apparatus 20B may re-transmit and/or rebroadcast the notification message. For example, the receiving vehicle apparatus 20B may transmit the notification message via a short or medium range communication protocol. For example, the receiving vehicle apparatus 20B may comprise means, such as processor 22, memory 24, communications interface 26, and/or the like, for transmitting the notification message via a short or medium range communication protocol. In an example embodiment, the notification message is transmitted via DSRC. In various embodiments, the receiving vehicle apparatus 20B transmits the notification message continuously, periodically, and/or the like for a predefined period of time and/or within a predefined distance of the location of the detected inconsistency. For example, the receiving vehicle apparatus 20B may transmit the notification message every five seconds, ten seconds, fifteen seconds, twenty seconds, thirty seconds, forty-five seconds, and/or minute for a predefined time period of five minutes, ten minutes, and/or the like, in an example embodiment. In an example embodiment, the receiving vehicle apparatus 20B may transmit the notification message every five seconds, ten seconds, fifteen seconds, twenty seconds, thirty seconds, forty-five seconds, and/or minute for as long as the receiving vehicle apparatus 20B is within 500 meters, 1000 meters, 1500 meters, 2000 meters, a tenth of a mile, an eighth of a mile, a quarter of a mile, and/or the like of the location of the detected inconsistency.

Re-transmitting a Notification Message by an Infrastructure Apparatus

In various embodiments, one or more infrastructure apparatuses 30 may be disposed in the vicinity of the detected inconsistency. For example, an infrastructure apparatus 30 may be secured to and/or a part of a street light, a traffic signal, a traffic sign, and/or the like. The infrastructure apparatus 30 may be used to aid in the transmission and/or broadcasting of the notification message to vehicles within the vicinity of the detected inconsistency. FIG. 6 provides a flowchart illustrating operations performed, such as by the infrastructure apparatus 30 in response to receiving a notification message, in accordance with an example embodiment. Starting at block 602, a notification message is received. For example, the infrastructure apparatus 30 may receive a notification message. For example, the infrastructure apparatus 30 may comprise means, such as processor 32, memory 34, communications interface 36, and/or the like for receiving a notification message. For example, the infrastructure apparatus 30 may receive the notification message via a short or medium range communication protocol such as, for example, DSRC. The infrastructure apparatus 30 may, responsive to receiving the notification message, process the notification message, retransmit the notification message, and/or the like.

At block 604, the notification message may be decompressed. For example, if the notification message comprises a compressed maplet and/or other indication of the detected inconsistency, the infrastructure apparatus 30 may decompress the compressed maplet and/or other indication of the detected inconsistency. For example, the infrastructure apparatus 30 may comprise means, such as the processor 32, memory 34, and/or the like, for decompressing a compressed maplet and/or other indication of the detected inconsistency.

At block 606, it may be determined if the notification message, maplet, and/or detected inconsistency correspond to the same inconsistency as an existing notification message, maplet, and/or indication of a detected inconsistency stored in memory 34. For example, the infrastructure apparatus 30 may determine if any of the notification messages, maplets, and/or indications of detected inconsistencies stored in the memory 34 correspond to the same inconsistency as the received notification message. In an example embodiment, the infrastructure apparatus 30 comprises means, such as the processor 32, memory 34, and/or the like, for determining if any of the notification messages, maplets, and/or indications of detected inconsistencies stored in the memory 34 correspond to the same inconsistency as the received notification message. For example, each notification message may comprise a message identifier configured to identify the notification message. The infrastructure apparatus 30 may compare the message identifier to the message identifiers of existing notification messages stored in the memory 34 to determine if the notification message has already been received and stored by the infrastructure apparatus 30. For example, the received notification message may be a re-broadcasted message. In another example, the infrastructure apparatus 30 may use one or more attributes of one or more model elements that are provided in the received notification message to determine if the received notification message corresponds to the same inconsistency as an existing notification message stored in the memory 34. For example, a location and classification of one or more model elements provided in the notification message may be used to determine if the received notification message corresponds to the same inconsistency as an existing notification message stored in the memory 34.

If it is determined, at block 606, that the received notification message corresponds to the same inconsistency as an existing notification message, aspects of the received notification message and aspects of the existing notification message may be fused and/or one of the received notification message and the existing notification message may be selected for storage and/or re-transmission and/or rebroadcasting, at block 608. For example, if the received notification message is a re-broadcast of the existing notification message, the infrastructure apparatus 30 may select one of the received notification message and the existing notification message to store and/or re-transmit and/or rebroadcast. If the received notification message comprises a received maplet and the existing notification message comprises an existing maplet, the infrastructure apparatus 30 may determine if the received maplet and the existing maplet include all of the same model elements and/or if the attributes of the model elements agree within a predefined attribute error. The model elements of the received maplet and the existing maplet may be fused to generate a combined maplet. For example, if the received maplet comprises a first element but not a second element and the existing maplet comprises the second element but not the first element, the combined maplet may comprise both the first and second elements. In another example, if both the received maplet and the existing maplet comprise a third element, but the location of the third element in the received maplet and the existing maplet is slightly different, the infrastructure apparatus 30 may determine which maplet is more accurate and use the location of the third element from the more accurate maplet to generate the combined maplet; the infrastructure apparatus 30 may average the locations of the third element from the received and existing maplets to generate the combined maplet; and/or the like. In various embodiments, the infrastructure apparatus may comprise means, such as processor 32, memory 34, and/or the like, for fusing and/or selecting a notification message.

At block 610, the notification message may be re-transmitted and/or rebroadcasted. For example, the infrastructure apparatus 30 may transmit the notification message via a short or medium range communication protocol. For example, the infrastructure apparatus 30 may comprise means, such as processor 32, memory 34, communications interface 36, and/or the like, for transmitting the notification message via a short or medium range communication protocol. In an example embodiment, the notification message is transmitted via DSRC. In various embodiments, the infrastructure apparatus 30 transmits the notification message continuously, periodically, and/or the like for a predefined period of time and/or within a predefined distance of the location of the detected inconsistency. For example, the infrastructure apparatus 30 may transmit the notification message every five seconds, ten seconds, fifteen seconds, twenty seconds, thirty seconds, forty-five seconds, and/or minute for a predefined time period of five minutes, ten minutes, and/or the like, in an example embodiment. In an example embodiment, the infrastructure apparatus 30 may transmit the notification message every five seconds, ten seconds, fifteen seconds, twenty seconds, thirty seconds, forty-five seconds, and/or minute for as long as the receiving vehicle apparatus 20B is within 500 meters, 1000 meters, 1500 meters, 2000 meters, a tenth of a mile, an eighth of a mile, a quarter of a mile, and/or the like of the location of the detected inconsistency. In various embodiments, the notification message transmitted and/or broadcasted by the infrastructure apparatus 30 may be a fused and/or selected notification message. For example, the notification message transmitted and/or broadcasted by the infrastructure apparatus 30 may comprise a combined maplet. In an example embodiment, the infrastructure apparatus 30 is configured to transmit a notification message via the Internet, automotive cloud, and/or other communication network 50 such that the network apparatus 10 may receive the notification message.

Collecting Notification Messages from Infrastructure Apparatuses in Communication-Limited Areas In various embodiments, one or more portions of the road network may be communication-limited portions of the road network in which the Internet, automotive cloud, and/or other communications network 50 may not be accessible. In various embodiments, a collection apparatus 40 may traverse a path in the vicinity of one or more infrastructure apparatuses in one or more communication-limited portions of the road network and receive one or more notification messages from one or more infrastructure apparatuses and/or vehicle apparatuses. The collection apparatus may then provide the notification messages to a network apparatus for updating of the map information/data of the digital map once the collection apparatus is in a location where the collection apparatus can access the Internet, automotive cloud, and/or another computer network. In an example embodiment, a collection apparatus is onboard an autonomous or remotely controlled collection vehicle. In an example embodiment, the remotely controlled collection vehicle is a drone and/or unmanned aircraft.

FIG. 7 provides a flowchart illustrating operations performed, such as by the collection apparatus 40 to collect one or more notification messages, in accordance with an example embodiment. Starting at block 702, the collection vehicle 3 traverses a predefined path. For example, the collection apparatus 40 may cause the collection vehicle 3 to traverse a predefined path. For example, the collection apparatus 40 may comprise means, such as processor 42, memory 44, one or more sensors 49, and/or the like, for causing the collection vehicle 3 to traverse a predefined path. For example, the memory 44 may store a predefined path and the processor 42 may use information/data captured by the one or more sensors 49 to instruct and/or cause one or more propulsion systems of the collection vehicle 3 to cause the collection vehicle 3 to traverse the predefined path. In various embodiments, the predefined path may cause the collection apparatus to pass within the vicinity of one or more infrastructure apparatuses 30.

At block 704, the collection apparatus 40 may query an infrastructure apparatus 30. For example, the collection apparatus 40 may, responsive to being located at a particular location along the predefined path, transmit a query. The infrastructure apparatus 30 may receive the query. In an example embodiment, the query may be a request for any notification messages stored by the infrastructure apparatus 30 (e.g., in memory 34) since the last time the collection apparatus 40 queried the infrastructure apparatus 30. For example, the collection apparatus 40 may comprise means, such as the processor 42, memory 44, communication interface 46, and/or the like, for querying the infrastructure apparatus 30.

At block 706, the collection apparatus 40 may receive one or more notification messages. For example, the collection apparatus 40 may comprise means, such as the processor 42, memory 44, communication interface 46, and/or the like, for receiving one or more notification messages. For example, the infrastructure apparatus 30 may, possibly in response to receiving a query, transmit one or more notification messages. The collection apparatus 40 may then receive the one or more notification messages. In various embodiments, each notification message comprises a maplet and/or other indication of a detected inconsistency.

At block 708, the one or more received notification messages, maplets, and/or other indications of the detected inconsistency are stored in local memory by the collection apparatus 40. For example, the collection apparatus 40 may comprise means, such as processor 42, memory 44, and/or the like, for locally storing the one or more received notification messages, maplets, and/or other indications of the detected inconsistency. For example, the one or more received notification messages, maplets, and/or other indications of the detected inconsistency may be stored in memory 44.

At block 710, the one or more received notification messages, maplets, and/or other indications of the detected inconsistency stored by the collection apparatus 40 (e.g., in memory 44) are transmitted via the Internet, automotive cloud, and/or other communication network 50. For example, responsive to the collection apparatus 40 being at a predetermined location and/or detecting that the collection apparatus 40 can access a wireless network 50, the collection apparatus 40 transmits the one or more received notification messages, maplets, and/or other indications of the detected inconsistency stored by the collection apparatus 40 (e.g., in memory 44). In various embodiments, the network apparatus 10 may receive the one or more received notification messages, maplets, and/or other indications of the detected inconsistency stored by the collection apparatus 40 (e.g., in memory 44) and updates a digital map and/or one or more tiles of a digital map based thereon.

Updating a Digital Map

In various embodiments, a network apparatus 10 may receive update messages and/or notification messages. The network apparatus 10 may then update a digital map and/or one or more tiles of a digital map based on the information/data provided by the update messages and/or notification messages. In various embodiments, the update messages and/or notification messages may comprise maplets and/or indications of detected inconsistencies. FIG. 8 provides a flowchart illustrating operations performed, such as by the network apparatus 10 to update a digital map and/or one or more tiles of the digital map, in accordance with an example embodiment.

Starting at block 802, one or more notification and/or update messages are received. For example, the network apparatus 10 may receive one or more notification and/or update messages. For example, the network apparatus 10 may comprise means, such as processor 12, memory 14, communications interface 18, and/or the like for receiving one or more notification and/or update messages. For example, each notification and/or update message may comprise a maplet and/or information/data regarding a model element that is inconsistent with corresponding map information/data of a digital map. For example, the inconsistency may be an inconsistency in one or more attributes of the model element compared to the corresponding map information/data, a model element that, based on the map information/data, is missing and/or absent from an environment model, a model element for which no corresponding map information/data is available in the digital map, and/or the like.

At block 804, the network apparatus 10 may decompress any compressed information/data in the one or more notification and/or update messages. For example, a notification and/or update message may comprise a compressed maplet and the network apparatus 10 may decompress the maplet. For example, the network apparatus 10 may comprise means, such as the processor 12, memory 14, and/or the like, for decompressing a compressed maplet and/or other compressed information/data of a notification and/or update message.

At block 806, the digital map and/or one or more tiles of the digital map are updated based on the one or more notification and/or update messages. For example, the information/data provided by a maplet may be used to update the map information/data of the digital map. For example, the network apparatus 10 may comprise means, such as the processor 12, memory 14, and/or the like, for updating the digital map and/or one or more tiles of the digital map based on the information/data provided by the one or more notification and/or update messages. For example, the digital map may be updated to incorporate the detected inconsistency and/or to make the digital map consistent with the environment model (as encapsulated by a maplet, for example) within a predetermined error. The updated digital map and/or portions thereof may be packaged into one or more updated tiles.

At block 808, one or more updated tiles of the digital map may be provided. For example, the network apparatus 10 may provide one or more updated tiles of the digital map. For example, the network apparatus 10 may comprise means, such as the processor 12, memory 14, communications interface 16, and/or the like for providing the one or more updated tiles of the digital map. For example, an updated tile may be provided (e.g., transmitted) and then received by a vehicle apparatus 20. The vehicle apparatus 20 may receive (e.g., via a communication interface 28) the updated tile of the digital map comprising and/or updated based on at least a portion of the information/data provided by the update and/or notification message(s). The vehicle apparatus 20 may then perform (e.g., via a processor and/or memory thereof) one or more navigation functions using the updated tile of the digital map. In various embodiments, navigation functions may be localization functions (e.g., determining the location of the vehicle apparatus 20 and/or another entity within a map), route planning functions (e.g., determining a route from an origin to a destination), route guidance functions (e.g., assisting an autonomous vehicle and/or human operator navigate a route from an origin to a destination), controlling ADAS (e.g., with functions such as lane keeping, lane changing assistance, automated overtake maneuvers, merging maneurvers, or autonomous driving, and/or other functions) and/or the like.

Advantages

Various embodiments of the present invention provide methods, apparatuses, systems, computer program products, and/or the like for providing notification messages to vehicle apparatuses onboard vehicles in the vicinity of an environment element of a road network that is not well described and/or is absent from the current version of a digital map. For example, if a vehicle apparatus 20A onboard a vehicle 5 identifies and/or detects one or more inconsistencies between an environment model generated based on sensor information/data captured by one or more sensors 29 onboard the vehicle 5 and at least one of the one or more inconsistencies is likely to affect the performance and/or result of at least one navigation function for a receiving vehicle apparatus 20B in the vicinity of the inconsistency, the vehicle apparatus 20A transmits a notification message. The notification message may be generated and transmitted in at least near real time with respect to the capturing of the sensor information/data from which the environment model was generated. A receiving vehicle apparatus 20B may receive the notification message and may update and/or perform one or more navigation functions based on the information/data provided by the notification message.

Accurate map information/data is important for the proper functioning of autonomous and ADAS vehicles. However, a road network is not static and updates to the digital map and/or the map information/data thereof may not be completed and disseminated in real time or near real time with respect to a change being made in the road network. For example, it may take several minutes from the time a change in the road network is first detected by a vehicle apparatus 20 and when the digital map may be updated and disseminated. Various embodiments of the present invention provide a technical solution to the technical problem of providing vehicle apparatuses 20 with at least near real time accurate map information/data that is relevant to the vehicle. The use of notification messages as described herein allows for near real time accurate information/data describing a portion of a road network allows for the notification of vehicle apparatuses of changes in a road network near by the vehicle. Various embodiments of the present invention also provide for efficient communication of changes in a road network that are detected by a vehicle apparatus 20 to a network apparatus 10 for updating of the digital map. An example embodiment of the present invention provides for efficient communication of changes in a road network that are detected by a vehicle apparatus 20 to a network apparatus 10 in communication-limited areas of a road network. For example, the information/data regarding the change to the network may be encapsulated in a maplet that is configured to be an efficient information/data packet so as to reduce the bandwidth needed to communicate the information/data regarding the change to the road network. Thus, various embodiments of the present invention provide for overcoming the technical challenge of being able to provide accurate and timely updates to a digital map. The digital map may then be used by the vehicle apparatus 20 to perform various navigation functions. Thus, various embodiments provide an improvement to navigation technology by providing for efficient and accurate updating of a digital map for use by a vehicle apparatus (e.g., navigation apparatus, ADAS, autonomous vehicle, and/or the like) in performing navigation functions.

III. Example Apparatus

The vehicle apparatus 20, infrastructure apparatus 30, collection apparatus 40, and/or network apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the vehicle apparatus 20, infrastructure apparatus 30, collection apparatus 40, and/or network apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In an example embodiment, a vehicle apparatus 20 is an in-vehicle navigation system onboard a vehicle 5 or a mobile device and a network apparatus 10 is a server. In this regard, FIG. 2A depicts an example network apparatus 10, FIG. 2B depicts an example vehicle apparatus 20, FIG. 2C depicts an example infrastructure apparatus 30, and FIG. 2D depicts an example collection apparatus 40 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In an example embodiment, an infrastructure apparatus 30 may include, may be associated with, or may otherwise be in communication with a processor 32, a memory device 34, and a communication interface 36, and/or other components configured to perform various operations, procedures, functions, or the like described herein. In an example embodiment, a collection apparatus 40 may include, may be associated with, or may otherwise be in communication with a processor 42 and a memory device 44 and optionally a communication interface 46, a user interface 48, one or more sensors 49 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein.

In some embodiments, the processor 12, 22, 32, 42 (and/or co-processors or any other processing circuitry assisting or otherwise associated with the processor) may be in communication with the memory device 14, 24, 34, 44 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, vehicle apparatus 20, infrastructure apparatus 30, and/or collection apparatus 40 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32, 42 may be embodied in a number of different ways. For example, the processor 12, 22, 32, 42 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32, 42 may include one or more processing cores configured to perform independently. A multi-core processor may enable multiprocessing within a single physical package. Additionally or alternatively, the processor 12, 22, 32, 42 may include one or more processors configured in tandem via the bus to enable independent execution of instructions, pipelining and/or multithreading.

In an example embodiment, the processor 12, 22, 32, 42 may be configured to execute instructions stored in the memory device 14, 24, 34, 44 or otherwise accessible to the processor. For example, the processor 22 may be configured to execute computer-executable instructions embedded within a link record of a map tile and/or provided as part of a travel plan. Alternatively or additionally, the processor 12, 22, 32, 42 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or vehicle apparatus 20 may include a user interface 18, 28 that may, in turn, be in communication with the processor 12, 22 to provide output to the user, such as one or more instances of map information/data and/or graphical presentations thereof, one or more routes through a road network, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 42 (e.g., memory device 14, 24, 44 and/or the like).

The network apparatus 10, vehicle apparatus 20, infrastructure apparatus 30, and/or collection apparatus 40 may optionally include a communication interface 16, 26, 36, 46. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, vehicle apparatus 20, infrastructure apparatus 30, and/or collection apparatus 40 of an example embodiment, a navigation system may also include or have access to a geographic database that includes a variety of data (e.g., map information/data) utilized in constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to links, road segments, nodes, intersection, and/or the like and/or the corresponding data records, a localization layer (e.g., comprising localization features) and/or the corresponding data records, and/or the like.

In an example embodiment, the road segment data records are links or segments, e.g., maneuvers of a maneuver graph, representing roads, streets, or paths, as can be used in the calculated route or recorded route information for determination of one or more personalized routes. The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from sensor information/data provided by vehicle apparatuses 20 through the use of update and/or notification messages comprising, for example, maplets. In various embodiments, the vehicle apparatuses 20 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, vehicle apparatus 20, infrastructure apparatus 30, and/or collection apparatus 40 in accordance with an example embodiment may determine the time to traverse a route that includes one or more turns at respective intersections more accurately.

IV. Apparatus, Methods, and Computer Program Products

As described above, FIGS. 4 and 5 illustrate flowcharts of a vehicle apparatus 20A, 20B, respectively, FIG. 6 illustrates a flowchart of an infrastructure apparatus 30, FIG. 7 illustrates a flowchart of a collection apparatus 40, and FIG. 8 illustrates a flowchart of a network apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34, 44 of an apparatus employing an embodiment of the present invention and executed by the processor 12, 22, 32, 42 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, simplifications, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    analyzing, by a vehicle apparatus comprising a processor and a memory, sensor data collected as the vehicle apparatus traverses at least a portion of a road network, the sensor data captured by one or more sensors onboard a vehicle, the vehicle apparatus being onboard the same vehicle, the sensor data being analyzed in at least near real time with respect to the capturing of the sensor data by the one or more sensors, wherein the sensor data is analyzed to generate an environment model corresponding to one or more elements in the environment surrounding the vehicle, each of the one or more elements (a) generated by combining two or more observations of a corresponding environment element encoded by the sensor data and (b) defined by a plurality of attributes determined based on the combined two or more observations of the corresponding environment element;
    comparing the plurality of attributes defining at least one of the one or more elements to map data stored in the memory;
    based on the comparing of the plurality of attributes defining the at least one of the one or more elements to the map data, detecting, by the vehicle apparatus, an inconsistency between at least one attribute of the plurality of attributes and the map data stored in the memory;
    responsive to the detected inconsistency satisfying a vehicle-to-vehicle criterion, generating, by the vehicle apparatus, a notification message comprising the plurality of attributes defining the at least one of the one or more elements in a defined data format, wherein the notification message comprises a maplet having a predefined data structure and wherein the maplet comprises fused representations of the one or more elements; and
    transmitting, via a communication interface of the vehicle apparatus and via a short or medium range communication protocol, the notification message.

2. The method of claim 1, wherein the notification message is a basic safety message (BSM).

3. The method of claim 1, wherein the short or medium range communication protocol is a dedicated short range communication (DSRC) protocol configured for use with an intelligent transportation system.

4. The method of claim 1, wherein an intended recipient of the notification message comprises at least one of a receiving vehicle apparatus or an infrastructure apparatus.

5. The method of claim 1, wherein when an infrastructure apparatus receives the notification message, the infrastructure apparatus stores the notification message to memory local to the infrastructure apparatus and transmits the notification message, an intended recipient of the notification message comprising at least one of a receiving vehicle apparatus or a collection apparatus.

6. The method of claim 1, wherein responsive to receiving and processing the notification message, a receiving vehicle apparatus performs at least one of:
    updating map information stored by a memory of the receiving vehicle apparatus based on the detected inconsistency,
    providing an alert to passengers within the vehicle that the receiving vehicle apparatus is onboard based on the detected inconsistency,
    adjusting one or more driving parameters of the vehicle that the receiving vehicle apparatus is onboard, or
    transmitting the notification message.

7. The method of claim 1, further comprising, when the vehicle apparatus is in communication with a network that provides access to an automotive cloud, transmitting an update message comprising an indication of the detected inconsistency via the network, wherein a network apparatus receives the update message and updates a digital map based on the indication of the detected inconsistency.

8. The method of claim 1, wherein the vehicle-to-vehicle criteria are configured to identify detected inconsistencies that are likely to affect the performance or result of a navigation function.

9. The method of claim 1, wherein the plurality of attributes provided in the notification message are compressed.

10. The method of claim 1, wherein the plurality of attributes defining the at least one of the one or more elements comprises an attribute selected from the group consisting of a classification, a feature identifier identifying a corresponding feature within the map data, a color, a time stamp corresponding to when the sensor data was captured, a size parameter, and a reflectivity parameter.

11. An apparatus comprising at least one processor, a communications interface configured for communicating via at least one network, one or more sensors, and at least one memory storing computer program code and map data, the apparatus being onboard a vehicle, the at least one memory and the computer program code configured to, with the processor, cause the apparatus to at least:
analyze sensor data collected as the vehicle traverses at least a portion of a road network, the sensor data captured by the one or more sensors, the sensor data being analyzed in at least near real time with respect to the capturing of the sensor data by the one or more sensors, wherein the sensor data is analyzed to generate an environment model corresponding to one or more elements in the environment surrounding the vehicle, each of the one or more elements (a) generated by combining two or more observations of a corresponding environment element encoded by the sensor data and (b) defined by a plurality of attributes determined based on the combined two or more observations of the corresponding environment element;
compare the plurality of attributes defining at least one of the one or more elements to map data stored in the memory;
based on the comparing of the plurality of attributes defining the at least one of the one or more elements to the map data, detect an inconsistency between at least one attribute of the plurality of attributes and the map data stored in the memory;
responsive to the detected inconsistency satisfying a vehicle-to-vehicle criterion, generate a notification message comprising the plurality of attributes defining the at least one of the one or more elements in a defined data format, wherein the notification message comprises a maplet having a predefined data structure and wherein the maplet comprises fused representations of the one or more elements; and
transmit, via the communication interface and via a short or medium range communication protocol, the notification message.

12. The apparatus of claim 11, wherein the notification message is a basic safety message (BSM).

13. The apparatus of claim 11, wherein the short or medium range communication protocol is a dedicated short range communication (DSRC) protocol configured for use with an intelligent transportation system.

14. The apparatus of claim 11, wherein an intended recipient of the notification message comprises at least one of a receiving vehicle apparatus or an infrastructure apparatus.

15. The apparatus of claim 11, wherein when an infrastructure apparatus receives the notification message, the infrastructure apparatus stores the notification message to memory local to the infrastructure apparatus and transmits the notification message, an intended recipient of the notification message comprising at least one of a receiving vehicle apparatus or a collection apparatus.

16. The apparatus of claim 11, wherein responsive to receiving and processing the notification message, a receiving vehicle apparatus performs at least one of:
updating map information stored by a memory of the receiving vehicle apparatus based on the detected inconsistency,
providing an alert to passengers within the vehicle that the receiving vehicle apparatus is onboard based on the detected inconsistency,
adjusting one or more driving parameters of the vehicle that the receiving vehicle apparatus is onboard, or
transmitting the notification message.

17. The apparatus of claim 11, wherein the at least one memory and the computer program code are further configured to, with the processor, cause the apparatus to at least, when the vehicle apparatus is in communication with a network that provides access to an automotive cloud, transmitting an update message comprising an indication of the detected inconsistency via the network, wherein a network apparatus receives the update message and updates a digital map based on the indication of the detected inconsistency.

18. The apparatus of claim 11, wherein the vehicle-to-vehicle criteria are configured to identify detected inconsistencies that are likely to affect the performance or result of a navigation function.

19. A computer program product comprising at least one non-transitory computer-readable storage medium having computer-readable program code portions stored therein, the computer-readable program code portions comprising executable portions configured, when executed by a processor of a vehicle apparatus, to cause the vehicle apparatus to:
analyze sensor data collected as the vehicle traverses at least a portion of a road network, the sensor data captured by the one or more sensors, the sensor data being analyzed in at least near real time with respect to the capturing of the sensor data by the one or more sensors, wherein the sensor data is analyzed to generate an environment model corresponding to one or more elements in the environment surrounding the vehicle, each of the one or more elements (a) generated by combining two or more observations of a corresponding environment element encoded by the sensor data and (b) defined by a plurality of attributes determined based on the combined two or more observations of the corresponding environment element;
compare the plurality of attributes defining at least one of the one or more elements to map data stored in the memory;
based on the comparing of the plurality of attributes defining the at least one of the one or more elements to the map data, detect an inconsistency between at least one attribute of the plurality of attributes and the map data stored in the memory;
responsive to the detected inconsistency satisfying a vehicle-to-vehicle criterion, generate a notification message comprising the plurality of attributes defining the at least one of the one or more elements in a defined data format, wherein the notification message comprises a maplet having a predefined data structure and wherein the maplet comprises fused representations of the one or more elements; and
transmit, via a communication interface of the vehicle apparatus and via a short or medium range communication protocol, the notification message.

20. The computer program product of claim 19, wherein (a) the notification message is a basic safety message (BSM), (b) the short or medium range communication protocol is a dedicated short range communication (DSRC) protocol configured for use with an intelligent transportation system, and (c) the notification message comprises a compressed parameterized representation of the at least one of the one or more elements.

* * * * *